(12) United States Patent
Li et al.

(10) Patent No.: US 12,311,468 B2
(45) Date of Patent: May 27, 2025

(54) AUTOMATED LSP PROCESS EQUIPMENT SYSTEM FOR AERO-ENGINE BLADE

(71) Applicants: QINGDAO UNIVERSITY OF TECHNOLOGY, Shandong (CN); SICHUAN FUTURE AEROSPACE INDUSTRY LLC, Sichuan (CN)

(72) Inventors: Changhe Li, Qingdao (CN); Zechen Zhang, Qingdao (CN); Bo Liu, Qingdao (CN); Shun Zhang, Qingdao (CN); Binwei Wang, Qingdao (CN); Jiazhi Yao, Qingdao (CN); Ang Li, Qingdao (CN); Wei Gao, Qingdao (CN); Yu Zhang, Qingdao (CN); Bingheng Lu, Qingdao (CN); Yanbin Zhang, Qingdao (CN); Mingzheng Liu, Qingdao (CN)

(73) Assignees: QINGDAO UNIVERSITY OF TECHNOLOGY, Qingdao (CN); SICHUAN FUTURE AEROSPACE INDUSTRY LLC, Shifang (CN)

( * ) Notice: Subject to any disclaimer, the term of this patent is extended or adjusted under 35 U.S.C. 154(b) by 776 days.

(21) Appl. No.: 17/550,836

(22) Filed: Dec. 14, 2021

(65) Prior Publication Data

US 2023/0047843 A1 Feb. 16, 2023

(30) Foreign Application Priority Data

Aug. 16, 2021 (CN) .......................... 202110936936.5

(51) Int. Cl.
*B23K 26/356* (2014.01)
*B23K 26/03* (2006.01)
(Continued)

(52) U.S. Cl.
CPC ............ *B23K 26/356* (2015.10); *B23K 26/03* (2013.01); *B23K 26/0884* (2013.01);
(Continued)

(58) Field of Classification Search
CPC .. B23K 26/356; B23K 26/03; B23K 26/0884; B23K 26/352; B23K 26/702;
(Continued)

(56) References Cited

U.S. PATENT DOCUMENTS 6,408,526 B1 * 6/2002 Montesanti ........ B23Q 17/2495
33/502
7,109,436 B2 * 9/2006 Even .................... B23K 26/042
269/87.3
(Continued)

FOREIGN PATENT DOCUMENTS

CN 210596195 U * 5/2020 ........... C21D 10/005
CN 111975640 A * 11/2020 ............. B05B 13/02
(Continued)

OTHER PUBLICATIONS

Machine English Translation of WO-2018082346-A1 (Year: 2018).*
(Continued)

*Primary Examiner* — Helena Kosanovic
*Assistant Examiner* — Erwin J Wunderlich
(74) *Attorney, Agent, or Firm* — JCIPRNET

(57) ABSTRACT

An automated laser shock peening (LSP) process equipment system for an aero-engine blade, including: a base, where a loading and unloading manipulator, working manipulator, reverse engineering mechanism, coating apparatus, and LSP apparatus are disposed; the loading and unloading manipulator is configured to grab a blade and place it on the reverse engineering mechanism, which includes a reverse engineering instrument and controller that are connected, the instrument can generate three-dimensional digital data of the
(Continued)

blade, and the controller generates a working path for coating and LSP according to the data, and transmits the path to the working manipulator; the loading and unloading manipulator places the blade into the pallet, and the working manipulator drives the blade to a corresponding position according to the path. Independent locating and clamping systems of the pallet and the blade and the pallet and the manipulator fix a position of the blade relative to the manipulator.

7 Claims, 13 Drawing Sheets

(51) Int. Cl.
| | |
|---|---|
| B23K 26/08 | (2014.01) |
| B23K 26/352 | (2014.01) |
| B23K 26/70 | (2014.01) |
| B23K 37/02 | (2006.01) |
| B23K 37/04 | (2006.01) |
| B23Q 17/20 | (2006.01) |
| B24B 19/14 | (2006.01) |
| B25J 9/00 | (2006.01) |
| B25J 9/02 | (2006.01) |
| B25J 11/00 | (2006.01) |
| B29D 99/00 | (2010.01) |
| C21D 10/00 | (2006.01) |
| F01D 5/28 | (2006.01) |

(52) U.S. Cl.
CPC .......... *B23K 26/352* (2015.10); *B23K 26/702* (2015.10); *B23K 37/02* (2013.01); *B23K 37/0443* (2013.01); *B23Q 17/20* (2013.01); *B25J 9/0084* (2013.01); *B25J 9/02* (2013.01); *B29D 99/0025* (2013.01); *C21D 10/005* (2013.01); *F01D 5/286* (2013.01); *B24B 19/14* (2013.01); *B25J 11/00* (2013.01)

(58) Field of Classification Search
CPC .... B23K 37/02; B23K 37/0443; B23Q 17/20; B25J 9/0084; B25J 9/02; B25J 11/00; B29D 99/0025; C21D 10/005; F01D 5/286; B24B 19/14
See application file for complete search history.

(56) References Cited

U.S. PATENT DOCUMENTS

| | | | | |
|---|---|---|---|---|
| 9,227,268 | B1 * | 1/2016 | McCoy | ................ B23K 26/356 |
| 10,399,180 | B2 * | 9/2019 | Xue | ..................... B23K 26/082 |
| 2016/0215362 | A1 * | 7/2016 | Xue | ..................... B23K 26/146 |
| 2022/0055208 | A1 * | 2/2022 | Li | ............................. B25J 5/02 |
| 2022/0243299 | A1 * | 8/2022 | Meng | ..................... F01D 5/286 |

FOREIGN PATENT DOCUMENTS

| | | | | |
|---|---|---|---|---|
| CN | 112474112 | A * | 3/2021 | |
| CN | 112475640 | A * | 3/2021 | ........... B23K 26/382 |
| CN | 112775577 | A * | 5/2021 | ............ B23K 31/02 |
| WO | WO-2018082346 | A1 * | 5/2018 | ......... B23K 26/0861 |

OTHER PUBLICATIONS

Machine English Translation of CN-111975640-A (Year: 2020).*
Machine English Translation of CN-112475640-A (Year: 2021).*
Machine English Translation of CN-112474112-A (Year: 2021).*
Machine English Translation of CN-112775577-A (Year: 2021).*
Machine English Translation of CN-210596195-U (Year: 2020).*

* cited by examiner

AUTOMATED LSP PROCESS EQUIPMENT SYSTEM FOR AERO-ENGINE BLADE

TECHNICAL FIELD

The present invention relates to the field of laser shock peening (LSP) technologies, and in particular, to an automated LSP process equipment system for an aero-engine blade.

BACKGROUND

The description in this section merely provides background information related to the present invention and does not necessarily constitute the prior art.

The LSP technology is widely applied to the fields such as aerospace, shipbuilding, and chemical engineering. An aero-engine blade may have a high working environment temperature, a heavy load, a complex stress status, and an extremely harsh working environment. Therefore, the surface peening is indispensable. For the surface peening, the shot peening is mainly used in early technologies. The shot peening is widely applied due to simple equipment and low costs. However, with the development of aerospace technologies, the working environments of the blades become more extreme and demands for the fatigue resistance of the blades are increasingly high. Therefore, the shot peening has gradually ceased to be a major means of the high-precision blade surface treatment technologies.

In the LSP, a new peening technology developed based on the conventional shot peening, the high-frequency, high-power, short-pulse laser beam is used to penetrate the intermediate confinement layer (water) to impact the surface of a workpiece with an absorption layer (black paint). The absorption layer is rapidly vaporized and ionized by laser irradiation to form plasma. The plasma continuously absorbs the energy, and the volume of the plasma expands rapidly. The expansion process of the plasma is confined by the confinement layer, thereby generating a strong shock wave propagating into a target material. Because the peak pressure (GPa level) of the shock wave is much higher than the dynamic yield strength of the material, the internal organization of the surface layer of the material may be changed, thereby improving the microstructure and stress distribution of the material, and improving the performance, such as the fatigue resistance, the abrasion resistance, and the stress corrosion resistance, of the material.

In the related art, a blade locating and fixing apparatus is disclosed, in which six types of "support nails" are used to realize the six-point locating principle, and two support nails of the blade tenon are used as the main locating plane. The top rod is disposed on a side of the main locating plane, and the top rod is manually screwed to achieve clamping. However, the clamping of the top rod and the two support nails causes the blade to produce a bending moment at the tenon part, resulting in a slight displacement of the blade body. The laser focus position is shifted, which affects the LSP effect. In addition, a set screw is used as the locking apparatus. However, during the LSP, there is one vibration per pulse, and the accumulation of a plurality of vibrations causes the set screw to loosen, resulting in unreliable clamping.

In the related art, a fixture for an aircraft blade is disclosed. The fixture uses a molding fixture with the same shape as the tenon. Although the fixture can achieve both locating and clamping, in a manufacturing process of the fixture, the difficulty in processing the molding fixture thereof is almost equal to that in processing a steam turbine wheel again. In addition, the fixture needs to clamp different aircraft blades repeatedly, and the different aircraft blades have different errors, resulting in slight changes of the relative position after each time of clamping, and even the occurrence of loose clamping. In this case, the LSP effect is weakened, and in a severe case, falling occurs during the peening process, resulting in hurt on an operator.

In the related art, a follow-up LSP apparatus and method are disclosed. The patent discloses a follow-up LSP apparatus with coaxial laser and water. The absorption belt formed by the absorption layer is close to the laser shock head, and the absorption belt is conveyed through the rotation of the motor. Although the absorption belt used in the patent is attached to the surface of the workpiece, the patent is only applicable to LSP for a large plane, and for the blade with a free plane, particularly, the root of the blade, the absorption belt cannot be attached to the surface of the blade, resulting in a poor LSP effect, a reduced anti-fatigue life of the blade, and a greatly shortened service time of the blade.

In view of the above, in the current LSP processes for an aero-engine blade, there are the following technical problems:

(1) A movement clamping mechanism loosens during laser pulses, which affects the effect of LSP.

(2) The shape design of the clamping part directly affects the precision of the repeated clamping, resulting in different LSP effects all the times and uneven quality.

(3) Because the design precision of the fixture is not high, it is likely to cause the manipulator to interfere with the laser during an angle adjustment process, which may cause accidents.

SUMMARY

To resolve the foregoing problem, the present invention provides an automated LSP process equipment system for an aero-engine blade. A loading and unloading manipulator is linked with a diffuse reflection-type photoelectric sensor to complete clamping of the blade in reverse engineering. Three-dimensional digital data of a blade body of the aero-engine blade is generated by a reverse engineering instrument. A computer sifts different processing positions according to different positions of LSP, to generate a corresponding processing path, and transmits data of the processing path to a working manipulator. The working manipulator is linked with two diffuse reflection-type photoelectric sensors to clamp a pallet, determines relative coordinates between the blade and the manipulator, and completes coating of an absorption layer and LSP through the processing path.

In some implementations, the following technical solutions are used:

An automated LSP process equipment system for an aero-engine blade is provided, including: a base, where a loading and unloading manipulator, a working manipulator, a reverse engineering mechanism, a coating apparatus, and an LSP apparatus are disposed on the base;

the loading and unloading manipulator is configured to grab a blade and place the blade on the reverse engineering mechanism, the reverse engineering mechanism includes a reverse engineering instrument and a controller that are connected to each other, the reverse engineering instrument can generate three-dimensional digital data of the blade, and the controller generates a working path for coating and LSP according to the three-dimensional digital data, and transmits the working path to the working manipulator; and a pallet for clamping the blade is disposed on the working manipulator; and the loading and unloading manipulator places the blade into the pallet, and the working manipulator drives the blade to a corresponding position according to the working path for coating and LSP operations.

Further, the automated LSP process equipment system for an aero-engine blade further includes: a loading rack for storing a to-be-treated blade and an unloading rack for storing an LSP-treated blade, where the loading rack or the unloading rack includes a cylinder, a clamping member, and a diffuse reflection-type photoelectric switch; and after the diffuse reflection-type photoelectric switch detects loading and unloading mechanical arms, the clamping member is controlled by the cylinder to loosen, to allow the loading and unloading mechanical arms to take out the blade.

Further, the reverse engineering mechanism further includes: a base, where a fixture, an X-axis feeding apparatus, and a Z-axis feeding apparatus are separately disposed on the base;

the fixture is disposed on the X-axis feeding apparatus, and is movable along an X-axis direction; and the reverse engineering instrument is disposed on the Z-axis feeding apparatus, and is movable along a Z-axis direction; and when the fixture moves along the X-axis direction, the reverse engineering instrument is enabled to perform reverse engineering on the blade on the fixture.

Further, the fixture uses a servo motor as an active member, implements clamping in the X-axis direction by adopting a slider-crank mechanism on one end, and implements clamping in a Y-axis direction by adopting a cam pushrod mechanism on an other end.

Further, a diffuse reflection-type photoelectric switch is disposed on the reverse engineering mechanism, and the diffuse reflection-type photoelectric switch is linked, when detecting that a fixture reaches a set position, with the loading and unloading manipulator for loading and unloading operations while performing linkage control on clamping and loosening of the fixture.

Further, the pallet includes: a servo motor, a first fixture body, a second fixture body, and a third fixture body; a main shaft of the servo motor is connected to a spiral gear, and the spiral gear and a helical ring gear form a cross-axis gear pair, for controlling a linear movement of each fixture body; and when the pallet clamps, end surfaces of the first fixture body, the second fixture body, and the third fixture body snugly fit each other to form a complete plane.

Further, a locking apparatus is disposed on the pallet, and the locking apparatus includes: an unlocking rod, a support frame, a lever, a first slider, and a second slider; an end of the unlocking rod is connected to a pallet housing, and an other end is connected to the first slider; the second slider having a movement direction opposite to that of the first slider is disposed in the unlocking rod; the lever is connected to the unlocking rod through a hinge head; two ends of the support frame are each provided with a rectangular groove, and the hinge head can pass through the rectangular groove; a short side of the rectangular groove is used as a fulcrum of the lever; and a spring is disposed between the second slider and the support frame, and the lever passes through a through hole at an end of the second slider.

Further, the working manipulator implements coating of an absorption layer and LSP of the blade through a path obtained in reverse engineering, and a water trough is arranged at a lower part of the LSP apparatus to collect water in an LSP process.

Further, a pallet standby station is further disposed on the base for placing the pallet and drying the pallet by using an axial flow ventilator; and an unlocking rod is disposed on the pallet standby station for unlocking a locking apparatus in the pallet, so as to remove the pallet from the working manipulator.

Further, the pallet standby station includes a servo motor and a plurality of cylinders uniformly arranged, the servo motor is connected to a fixed ratchet and a movable ratchet through an output shaft, the movable ratchet moves vertically by using a disc spring, the movable ratchet rotates clockwise to implement clamping, and rotates counterclockwise to implement steering of the pallet standby station, and the cylinders force the movable ratchet to be detached from the fixed ratchet and rotate counterclockwise to loosen.

Compared with the prior art, the present invention has the following beneficial effects:

There are sensors in all apparatuses of the present invention to realize linkage, and no staff participates in the entire process, thereby achieving automation. Clamping and loosening of a reverse engineering mechanism are implemented by using a diffuse reflection-type photoelectric switch, and the efficiency of clamping is improving by using a loading and unloading manipulator. The clamping process is refined, to help calculate a production rhythm.

In the present invention, a pallet is used for clamping a blade, to complete coating of an absorption layer and LSP of the blade. A sealing apparatus is disposed on the pallet, to prolong the service life of the pallet. Two independent locating and clamping systems of the pallet and the blade and the pallet and the manipulator fix the blade relative to the position of the manipulator, thereby facilitating conversion and implementation of path planning.

In the present invention, two diffuse reflection-type photoelectric switches are arranged on a working manipulator to respectively implement linkage of blade clamping and linkage of pallet clamping, and a locking apparatus is disposed to prevent accidents.

In the present invention, a pair of end-surface ratchets are used in a pallet standby station, and to avoid an error in rotation, the length and the angle of a transmission rod of a clamping apparatus both have specific quantitative relationships.

BRIEF DESCRIPTION OF THE DRAWINGS

FIG. 5(*b*) is a partial enlarged view at a position A in FIG. 5(*a*);

Figure 1:
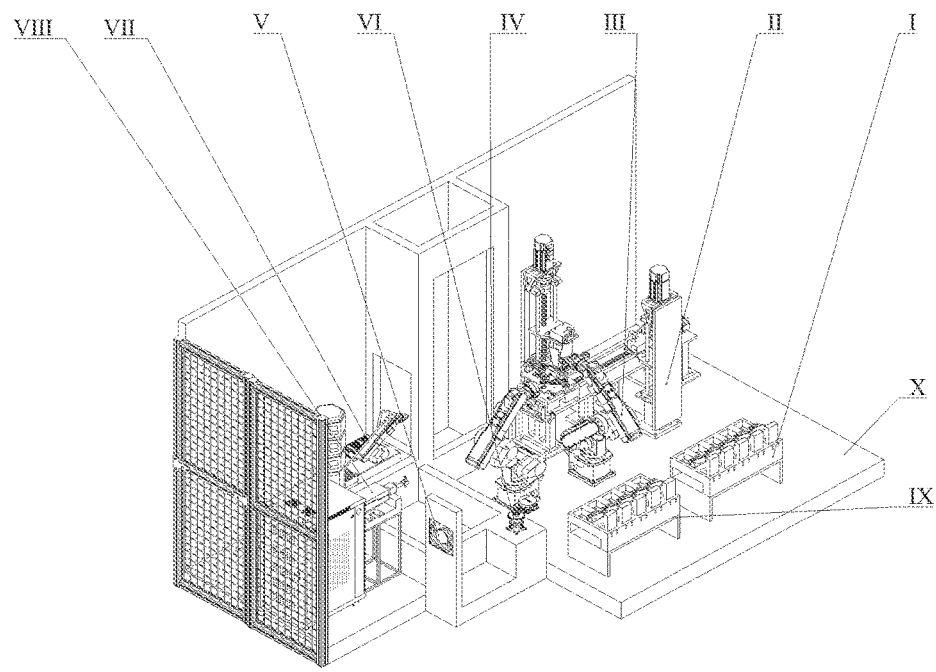
FIG. 1 is a schematic diagram of an overall structure of an automated LSP process equipment system for an aero-engine blade according to an embodiment of the present invention.

I: loading rack, II: reverse engineering mechanism, III: loading and unloading manipulator, IV: working manipulator, V: axial flow ventilator, VI: pallet standby station, VII: coating apparatus, VIII: LSP apparatus, IX: unloading rack, and X: base; II-1: middle support base, II-2: linear feeding mechanism, II-3: reverse engineering instrument, II-4: blade, II-5: fixture, II-6: Z-axis ball screw nut, II-7: X-axis ball screw nut, II-8: diffuse reflection-type photoelectric switch, II-9: reverse engineering instrument base; II-2-1: screw support side, II-2-2: screw support fixing side, II-2-3: first servo motor, II-2-4: coupling, II-2-5: guide rod; II-5-1: fixture base, II-5-2: side clamping apparatus, II-5-3: first shafting, II-5-4: locating block, II-5-5: second shafting, II-5-6: third shafting, II-5-7: gear rack, II-5-8: gear rack auxiliary locating block, II-5-9: support base; II-5-2-1: sliding rail base, II-5-2-2: driven body, II-5-2-3: first link, II-5-2-4: slider, II-5-2-5: second link, II-5-2-6: clamping block; II-5-5-1: support plate, II-5-5-2: outer ring gear; II-5-3-1: motor, II-5-3-2: motor support base; II-5-7-1: cylindrical locating block, II-5-7-2: gear rack locating block; II-5-6: third shafting, II-5-6-1: set screw, II-5-6-2: first shaft end retaining cap, II-5-6-3: shaft, II-5-6-4: cam, II-5-6-5: sleeve, II-5-6-6: driven gear, II-5-6-7: angular contact ball bearing, II-5-6-8: end cap, II-5-6-9: tappet, II-5-6-10: return spring, II-5-6-11: support block, II-5-6-12: tongue-and-groove clamping block; IV-1: pallet, IV-2: manipulator head, IV-1-1: fixture active-apparatus and IV-1-2: fixture driven-apparatus, IV-1-3: housing, IV-1-4: connecting seat; IV-1-1-1: first fixture body, IV-1-1-2: second fixture body, IV-1-1-3: third fixture body, IV-1-1-4: transmission rod; IV-1-2-1: unlocking rod, IV-1-2-2: first slider, IV-1-2-3: lever, IV-1-2-4: support frame, IV-1-2-5: spring, IV-1-2-6: pin, IV-1-2-7: second slider; IV-1-3-1: first spiral gear, IV-1-3-2: helical ring gear, IV-1-3-3: second spiral gear; IV-2-1: first diffuse reflection-type photoelectric sensor, IV-2-2: second diffuse reflection-type photoelectric sensor, IV-2-3: sensor base, IV-2-4: ring housing, IV-2-5: manipulator, IV-2-6: first clamping jaw, IV-2-7: shaft end retaining ring, IV-2-8: first connecting block, IV-2-9: double-acting cylinder, IV-2-10: cotter pin, IV-2-11: hinge head, IV-2-12: first transmission rod, IV-2-13: second transmission ring, IV-2-14: cylinder base, IV 15: second connecting block, IV-2-16: second clamping jaw, IV-2-17: fixing ring, IV-2-18: pallet locating body;

IV-2-18-1: first cambered surface, IV-2-18-2: second cambered surface; VI-1: standby station base, VI-2: limiting rod, VI-3: cylinder rod, VI-4: cylinder support base, VI-5: cylinder, VI-6: second servo motor, VI-7: coupling, VI-8: stepped shaft, VI-9: thrust bearing, VI-10: spring support base, VI-11: disc spring, VI-12: movable end-surface ratchet, VI-13: fixed end-surface ratchet, VI-14: first shaft end cap, VI-15: radial angular contact ball bearing, VI-16: bottom plate, VI-17: second shaft end cap, VI-18: second cam, VI-19: second shaft end retaining cap, VI-20: linear slider, VI-21: long link, VI-22: unlocking block, VI-23: protective shell, VI-24: clamping plate; VII-1: bin, VII-2: electrically-controlled apparatus, VII-3: support, VII-4: coating head, VII-5: coating apparatus base; VIII-1: laser emitter base, VIII-2: marble pedestal, VIII-3: laser head, VIII-4: water flow port, VIII-5: lens array, VIII-6: laser generator; IX-1: rack base, IX-2: rack support base, IX-3: linear cylinder, IX-4: piston rod, IX-5: locating ramp, IX-5: cylinder support, IX-6: ball head locating body, IX-7: rotary clamping body, and IX-8: second diffuse reflection-type photoelectric switch.

DETAILED DESCRIPTION

It should be noted that the following detailed descriptions are all exemplary and are intended to provide further descriptions of this application. Unless otherwise specified, all technical and scientific terms used in the present invention have the same meaning as commonly understood by a person of ordinary skill in the art to which this application belongs.

It should be noted that terms used herein are only for describing specific implementations and are not intended to limit exemplary implementations according to this application. As used herein, the singular form is intended to include the plural form, unless the context clearly indicates otherwise. In addition, it should further be understood that terms "include" and/or "comprise" used in this specification indicate that there are features, steps, operations, devices, components, and/or combinations thereof.

Embodiment 1

In one or more implementations, referring to FIG. 1, an automated LSP process equipment system for an aero-engine blade is disclosed, including: a loading rack I, a reverse engineering mechanism II, a loading and unloading manipulator III, a working manipulator IV, an axial flow ventilator V, a pallet standby station VI, a coating apparatus VII, an LSP apparatus VIII, an unloading rack IX, and a base X.

Figure 2:
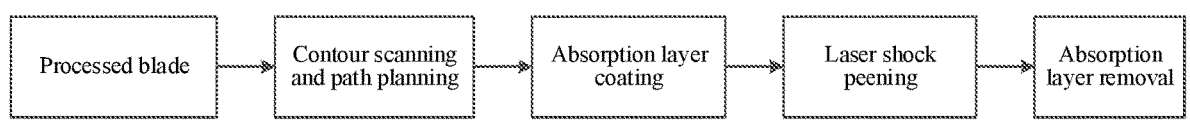
FIG. 2 is a flowchart of an LSP process according to an embodiment of the present invention.

The loading and unloading manipulator III uses a known six-degree-of-freedom robot with a clamping function as a working element, and may be a palletizing manipulator or the like in the related art. The axial flow ventilator V is fixed on the base X for blow drying. In addition, a process procedure shown in FIG. 2 is completed according to the order, and specifically includes the following:

The loading and unloading manipulator grabs a blade from the loading rack and places the blade on the reverse engineering mechanism. The reverse engineering mechanism includes a reverse engineering instrument and a controller that are connected to each other. The reverse engineering instrument can generate three-dimensional digital data of the blade. The controller generates a working path for coating and LSP according to the three-dimensional digital data, and transmits the working path to the working manipulator. A pallet for clamping the blade is disposed on the working manipulator. The loading and unloading manipulator places the blade into the pallet. The working manipulator drives the blade to a corresponding position according to a planned working path for coating and LSP operations. Finally, an absorption layer is removed.

The reverse engineering mechanism includes a base. A reverse engineering instrument, a controller, a fixture, an X-axis feeding apparatus, and a Z-axis feeding apparatus are respectively disposed on the base. The reverse engineering instrument can generate three-dimensional digital data of the blade. The controller generates a working path for coating and LSP according to the three-dimensional digital data, and transmits the working path to the working manipulator IV. The fixture is disposed on the X-axis feeding apparatus, and is movable along an X-axis direction. The reverse engineering instrument is disposed on the Z-axis feeding apparatus, and is movable along a Z-axis direction. When the fixture moves along the X-axis direction, the reverse engineering instrument is enabled to perform reverse engineering on the blade on the fixture.

Figure 3:
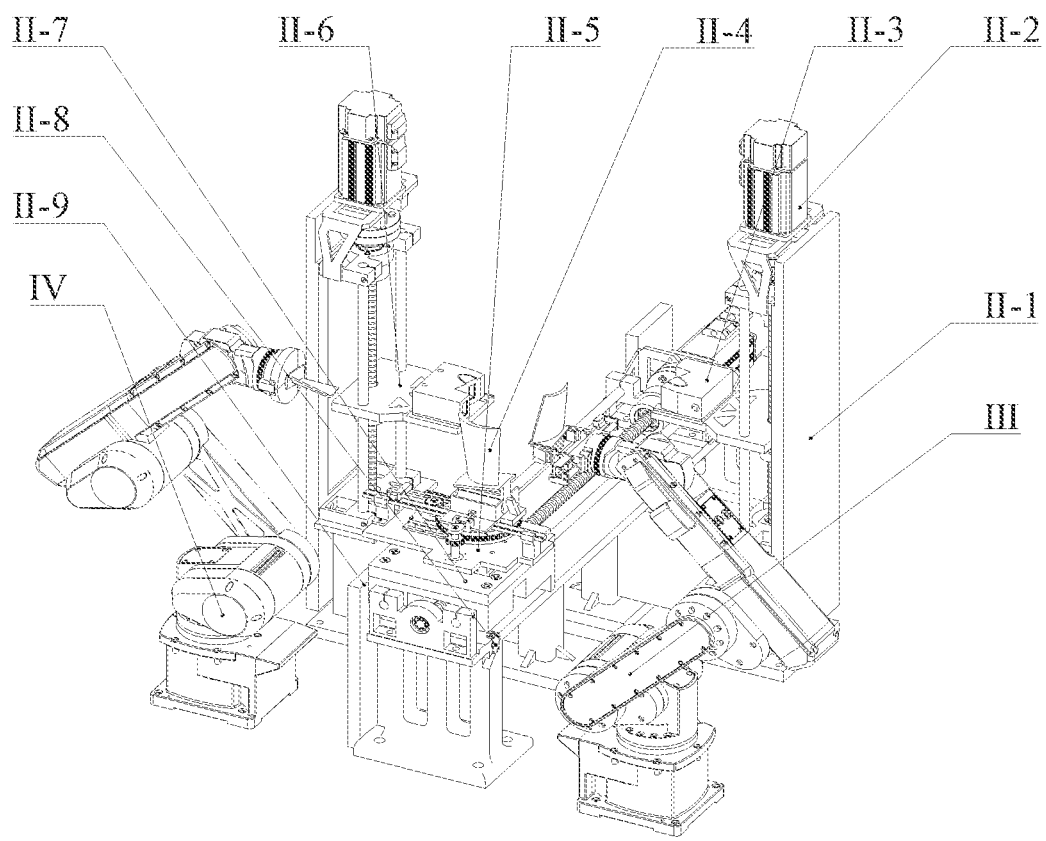
FIG. 3 is a schematic diagram of an overall structure of a reverse engineering structure according to an embodiment of the present invention.

Specifically, referring to FIG. 3, the reverse engineering mechanism II includes: a middle support base II-1, a linear feeding mechanism II-2, a reverse engineering instrument II-3, a fixture II-5, a Z-axis ball screw nut II-6, an X-axis ball screw nut II-7, a diffuse reflection-type photoelectric switch II-8, and a reverse engineering instrument base II-9. A blade II-4 is placed in the reverse engineering mechanism as a scanned part.

In this embodiment, because the reverse engineering instrument on the Z-axis linear feeding mechanism can scan only one side of the blade, if the entire blade is scanned, reverse engineering instruments need to be arranged on both sides and cannot be arranged symmetrically to prevent mutual impact.

The blade is clamped on the fixture. During the first clamping, the X-axis ball screw nut II-7 carrying the fixture II-5 moves to the leftmost position for the first time. The diffuse reflection-type photoelectric switch II-8 detects a signal, and triggers a motor II-5-3-1 to implement clamping. A first servo motor II-2-3 starts to run, to enable the X-axis ball screw nut II-7 to run from left to right and then from right to left, so that the reverse engineering instrument II-3 obtains digital information of a three-dimensional contour of the blade II-4. When a scanning range of the reverse engineering instrument II-3 exceeds a maximum height of the blade, no Z-axis movement is needed. Otherwise, when the X-axis ball screw nut moves from right to left, a Z-axis ball screw moves upward to scan an unscanned area.

Figure 4:
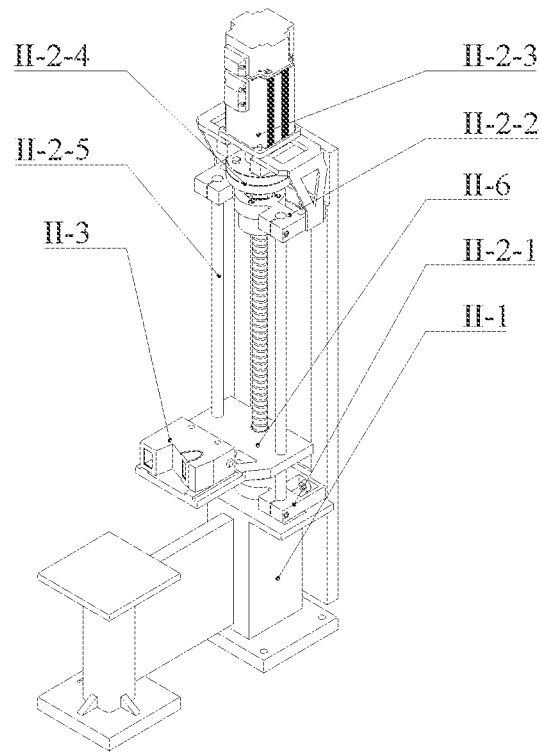
FIG. 4 is a schematic structural diagram of a linear feeding mechanism according to an embodiment of the present invention.

With reference to FIG. 4, on the Z-axis feeding apparatus, a Z-axis movement of the reverse engineering instrument II-3 is completed by the middle support base II-1 and the linear feeding mechanism II-2.

The middle support base II-1 is configured to support the entire linear feeding mechanism II-2 and the reverse engineering instrument base II-9. Because the reverse engineering instrument base II-9 has a relatively large span and is likely to collapse in the middle part, two middle support bases II-1 are disposed.

The linear feeding mechanism II-2 includes a first servo motor II-2-3 connected to the Z-axis ball screw by a coupling II-2-4, where guide rods II-2-5 are disposed in parallel on two sides of the Z-axis ball screw for guiding.

A screw fixing side II-2-2 is connected to the first servo motor II-2-3, the screw fixing side II-2-2 is connected to the middle support base II-1, and a screw support side II-2-1 on an other side is connected to the middle support base II-1.

The Z-axis ball screw nut II-6 matches the Z-axis ball screw, and the reverse engineering instrument II-3 is fixed to the Z-axis ball screw nut II-6 and can move with the Z-axis ball screw nut II-6. The Z-axis ball screw nut II-6 is in a clearance fit with the guide rod II-2-5 through a through hole, to implement guidance of the Z-axis ball screw nut II-6, and the reverse engineering instrument II-3 moves perpendicular to the ball screw to adjust a Z-axis position of the reverse engineering instrument II-3.

In this embodiment, a working principle of the reverse engineering instrument II-3 is as follows. By reflecting a light spot generated on a surface of a blade, a displacement Y of a measured point D relative to a reference $D_0$ may show a corresponding displacement X at a receiving place of a sensor. Through a series of scans, surface contour information of a modified blade is transmitted to a controller in the form of a digital point cloud, a camera coordinate system is transferred to a world coordinate system, the digital point cloud is processed, and then gray value processing, extreme value processing, noise processing, and the like are performed, to generate three-dimensional digital data of a surface contour of the blade and a corresponding processing path.

An implementation of the X-axis feeding apparatus is similar to that of the linear feeding apparatus, whose details are not described again.

The X-axis ball screw nut II-7 divided into a ball screw nut and a platform. The platform can implement cushioning and shock absorption. The introduction of the platform can reduce the difficulty in processing the ball screw nut, so that the X-axis ball screw nut does not require a high-precision hole while also requiring a high-precision plane. The ball screw nut and the platform are connected by a bolt through a countersunk through hole and a threaded hole. The ball screw nut is connected to the ball screw, to complete a feeding action.

Figure 5A:
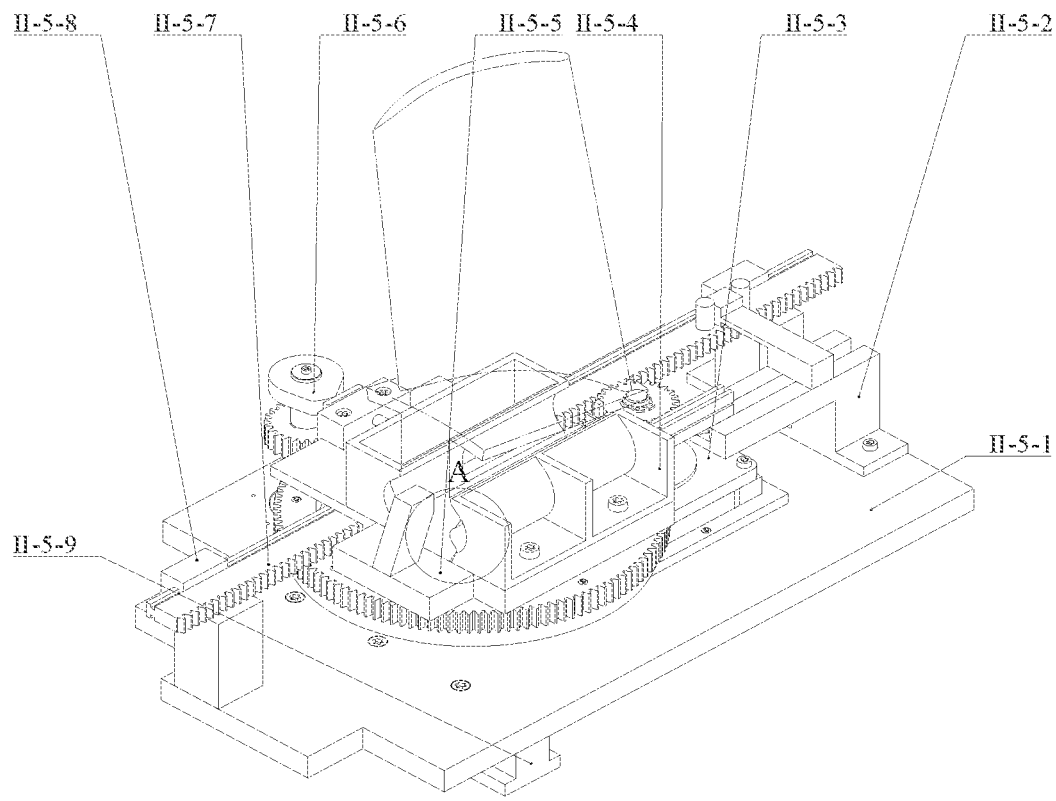
FIG. 5(*a*) is a schematic structural diagram of a fixture according to an embodiment of the present invention.
FIG. 5(c) is a schematic structural diagram of a side clamping apparatus according to an embodiment of the present invention.
FIG. 5(d) is a schematic structural diagram of a driven body according to an embodiment of the present invention.
FIG. 5(e) is a schematic structural diagram of a shafting according to an embodiment of the present invention.
Figure 5B:
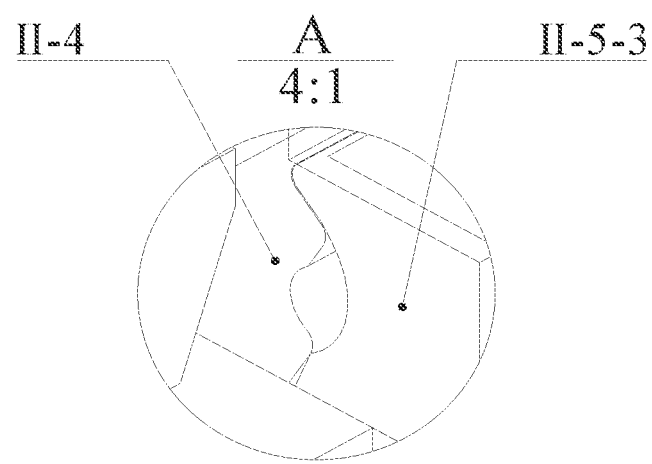

With reference to FIG. 5(a) and FIG. 5(b), the fixture II-5 includes a fixture base II-5-1, a side clamping apparatus II-5-2, a first shafting II-5-3, a locating block II-5-4, a second shafting II-5-5, a third shafting II-5-6, a gear rack II-5-7, a gear rack auxiliary locating block II-5-8, and a support base II-5-9.

In this embodiment, the loading and unloading manipulator carries the blade into the fixture of the reverse engineering mechanism from one side, and the X-axis ball screw nut II-7 is provided with a threaded hole for fixing the fixture. An X-axis screw drives the fixture to move along an X-axis direction. The fixture uses the servo motor as an active member, implements clamping in the X-axis direction by adopting a slider-crank mechanism on one end, and implements clamping in the Y-axis direction by adopting a cam pushrod mechanism on an other end. In addition, spring is disposed for returning. The first shafting II-5-3 is used as an active shafting. The servo motor provides power to drive a gear on a main shaft. The gear is relatively broad and can be engaged with both an outer ring gear II-5-5-2 on the second shafting II-5-5 and a gear rack of the slider-crank mechanism. In addition, the second shafting II-5-5 transmits power to the third shafting II-5-6 to implement the clamping, by the cam pushrod mechanism, the blade. The gear rack on the slider-crank mechanism is engaged with the gear on the first shafting II-5-3 and then transmits power to the slider-crank mechanism to clamp the blade.

For locating of the entire fixture for clamping the blade, a large plane is used as a locating reference to limit three degrees of freedom, a lower half part of the locating block II-5-4 on a side surface has only one line in contact with the blade as a locating reference to limit two degrees of freedom, and a locating block is drawn from a support plate II-5-5-1 to limit one degree of freedom, thereby implementing overall limitation of six degrees of freedom. A part of an upper half part of the locating block II-5-4 that is in imaginary contact with the blade only implements auxiliary support, and a larger clearance tolerance zone code is adopted. The partial view of the upper half part is shown in FIG. 5(b). Only when a clamping apparatus of the third shafting II-5-7 implement a clamping function, the upper half part of the locating block II-5-4 implements clamping. Support nails on the other side surface limit one degree of freedom, and a total of six degrees of freedom are limited. The clamped blade II-4 is represented by double-dotted lines. Since a tongue-and-groove part of the blade is the most precise part in processing of the entire blade, degradation of the precision due to scratching needs to be avoided during clamping, so that clamping is implemented perpendicular to the tongue-and-groove and the side surface.

The height of the overall fixture design is not higher than a blade tip shroud part of the blade, to prevent interference from being generated in a process of three-dimensional contour scanning and affecting digital extraction of a three-dimensional contour.

Figure 5C:
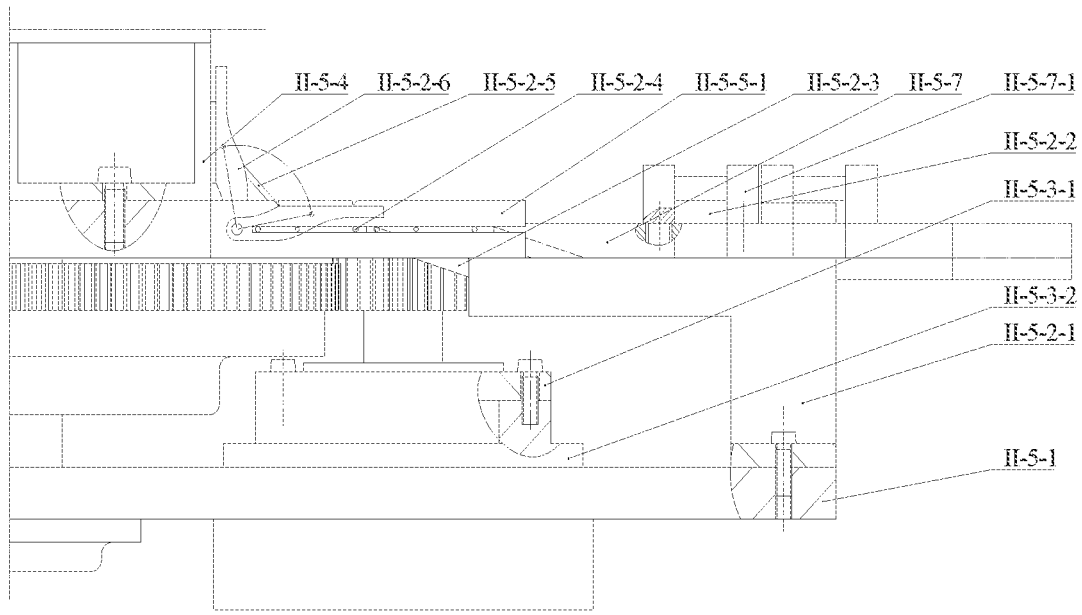

FIG. 5(c) is a schematic diagram of a limit position of a side clamping apparatus II-5-2. As shown in the figure, a clamping block II-5-2-6 is hingedly connected to a second link II-5-2-5 and a support plate II-5-5-1. An other end of the second link II-5-2-5 is also hingedly connected to a slider II-5-2-4. The slider II-5-2-4 is connected to a driven body II-5-2-2 by a first link II-5-2-3.

Figure 5D:
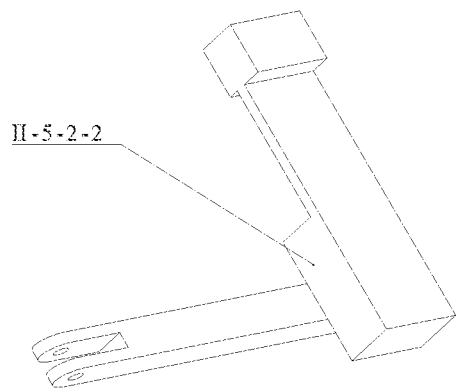

An axonometric diagram of the driven body II-5-2-2 is shown in FIG. 5(d). The bottom of the driven body II-5-2-2 forms a convex shape and is in a clearance fit with a groove of a sliding rail base II-5-2-1, so that the driven body II-5-2-2 slides on the sliding rail base II-5-2-1 to push the side clamping apparatus II-5-2 to implement the clamping function. The fixture base II-5-1, the motor II-5-3-1, and a motor support base II-5-3-2 are fixedly connected to each other. The gear rack II-5-7 is in a clearance fit with a gear rack locating block II-5-7-2, so that the gear rack II-5-7 can slide in a groove of the gear rack locating block II-5-7-2. The double dotted lines in the figure represent the clamping block II-5-2-6 in a loosening state. An upper end surface of the clamping block II-5-2-6 is coplanar with an upper end surface of the support plate II-5-5-1. The reason for this design is that when the blade II-4 is put into the fixture, a specific space is given on the right side to prevent the interference of the manipulator.

It should be noted that in an installation process of the entire side clamping apparatus, the clamping block II-5-2-6, the second link II-5-2-5, the slider II-5-2-4, and the first link II-5-2-3 are connected in sequence, then the driven body II-5-2-2 is hingedly connected to the first link II-5-2-3, the clamping block II-5-2-6 is adjusted to level and is put on a groove of the support plate II-5-5-1, the driven body II-5-2-2 is put into the groove of the sliding rail base II-5-2-1, a position of the gear rack II-5-7 is adjusted, and finally, two cylindrical locating blocks II-5-7-1 are respectively screwed into threaded holes of the gear rack, a position of the driven body II-5-2-2 is located, and the installation of the side clamping apparatus is completed.

Figure 5E:
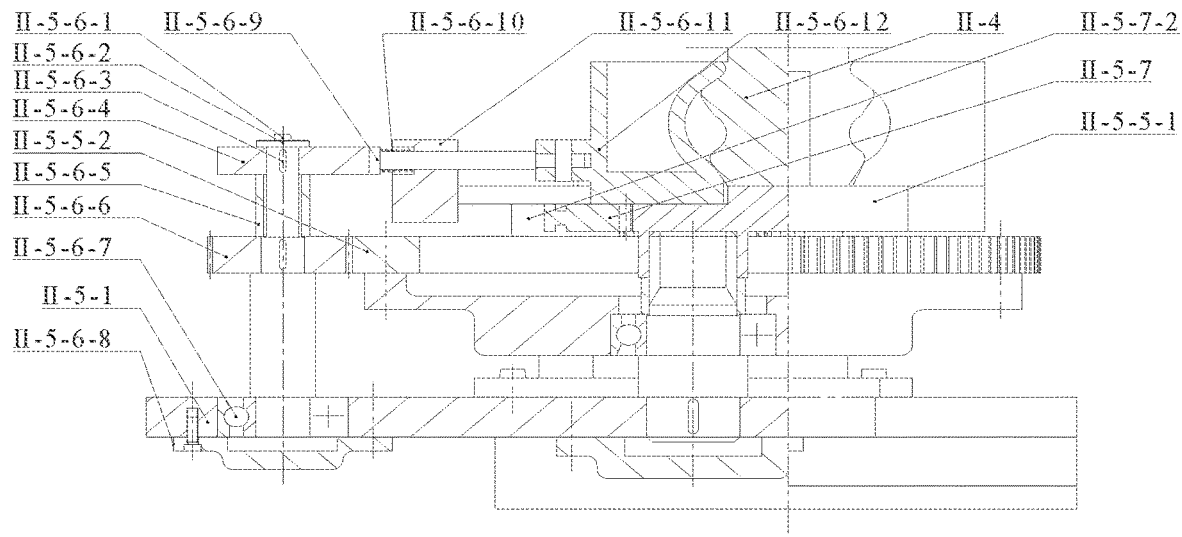

With reference to FIG. 5(e), the third shafting II-5-6 includes a set screw II-5-6-1, a first shaft end retaining cap II-5-6-2, a shaft II-5-6-3, a cam II-5-6-4, a tappet II-5-6-9, a return spring II-5-6-10, a support block II-5-6-11, a tongue-and-groove clamping block II-5-6-12, to form a tongue-and-groove clamping apparatus.

In the third shafting II-5-6, the cam II-5-6-4 is axially located by the first shaft end retaining cap II-5-6-2 and a sleeve II-5-6-5, and a keyway on the shaft II-5-6-3 is connected to a keyway of the cam II-5-6-4 by a key to achieve radial fixation. An other end of the sleeve II-5-6-5 is in contact with a driven gear II-5-6-6, and the driven gear II-5-6-6 is axially located by a shaft shoulder of a joint shaft II-5-6-3. The driven gear II-5-6-6 is radially located through a key connection. The shaft II-5-6-3 is connected to the fixture base II-5-1 through an angular contact ball bearing II-5-6-7, and an end cap II-5-6-8 is connected to the fixture base II-5-1. At an execution end, the tappet II-5-6-9 passes through the support block II-5-6-11 through a clearance fit, and is connected to the return spring II-5-6-10. An other end of the tappet II-5-6-9 is connected to the tongue-and-groove clamping block II-5-7-12 through a pin.

The overall working process is as follows: An outer ring gear II-5-5-2 used as an active gear is engaged with the driven gear II-5-6-6 and drives the driven gear II-5-6-6 to rotate. The driven gear II-5-6-6 transmits torque through a key connection and drives the shaft II-5-6-3 and the cam II-5-7-4 to rotate. The cam II-5-6-4 is in linear contact with the tappet II-5-6-9 to push the tappet II-5-6-9 forward. The tappet II-5-6-9 pushes the tongue-and-groove clamping block II-5-6-12 through a pin connection. The tongue-and-groove clamping block II-5-6-12 and the support plate II-5-5-1 make the tongue-and-groove clamping block II-5-6-12 move along a fixed direction in a dovetail groove manner to implement clamping.

Through the descriptions of a specific structure and specific functions of the entire fixture body, it can be seen that the height of the entire fixture is not higher than a blade base.

In this way, during running of the reverse engineering mechanism II, the height of the fixture does not cause the blocking of the blade body of the blade II-4, so that scanning of the blade by the reverse engineering instrument II-3 is not interfered with and subsequent work is not affected. In addition, during an entire reverse engineering process, clamping forces provided by the clamping apparatus only need to resist tiny vibrations caused by the movement of the X-axis ball screw nut II-7, so that the blade II-4 is not forced in the reverse engineering process. Therefore, the clamping force does not need to be too large provided that the stability of the blade II-4 is ensured.

Figure 6:
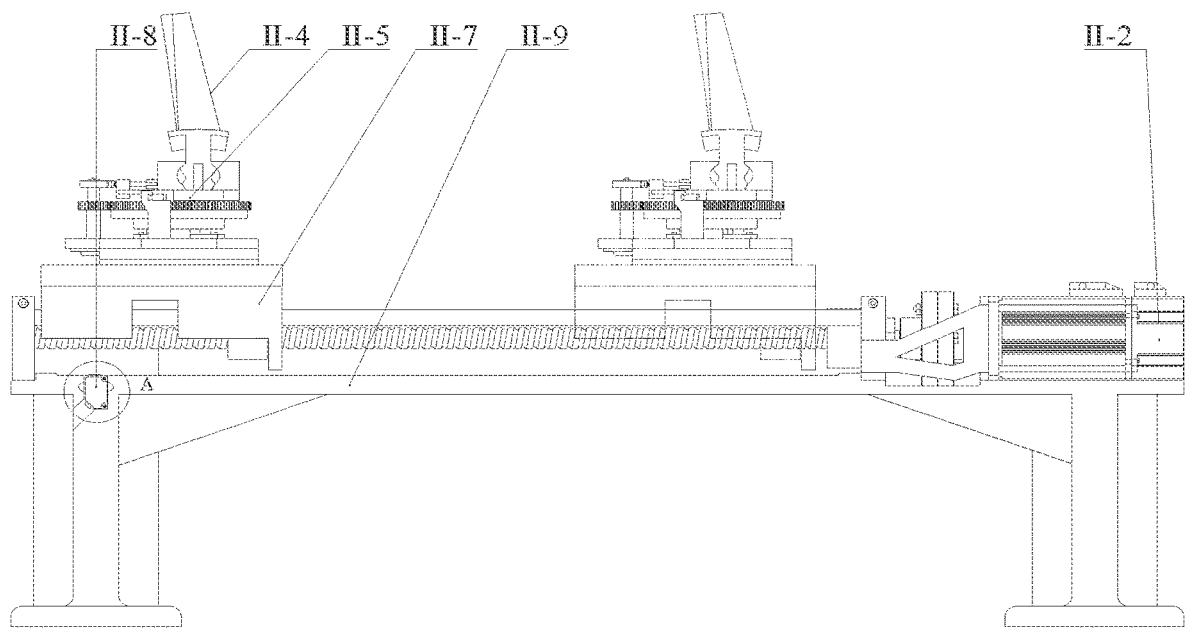
FIG. 6 is a schematic diagram of a limit position of a fixture in a reverse engineering mechanism according to an embodiment of the present invention.

Referring to FIG. 6, the diffuse reflection-type photoelectric switch II-8 is fixed on the reverse engineering instrument base II-9, and pits on two sides of the diffuse reflection-type photoelectric switch II-8 are crafted pits, which helps remove the diffuse reflection-type photoelectric switch II-8 from the reverse engineering instrument base II-9. The diffuse reflection-type photoelectric switch II-8 includes a receiver, a transmitter, and a data transmission line. The existence of the diffuse reflection-type photoelectric switch II-8 is to detect a position of the fixture II-5 through the photoelectric switch, so as to implement linkage with the motor II-5-3-1 in the fixture II-5.

After the loading and unloading manipulator places the blade into the fixture, the diffuse reflection-type photoelectric switch receives information and starts to run. The X-axis ball screw nut II-7 drives the fixture body II-5 to move along the X-axis direction, and the reverse engineering instrument is driven by the Z-axis ball screw nut, to implement the digital extraction of the three-dimensional contour of the blade.

Figure 7:
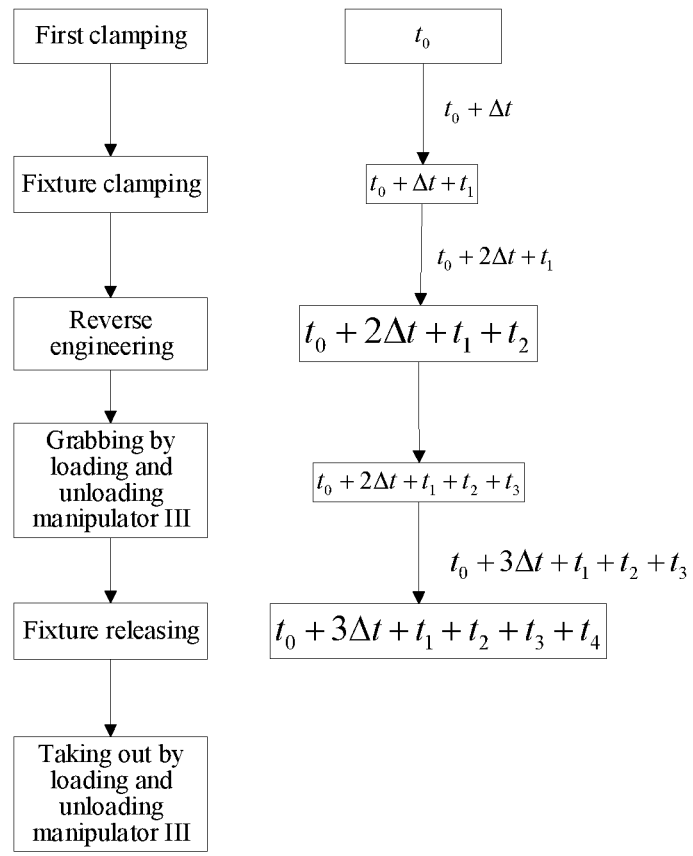
FIG. 7 is a flowchart of linkage between a reverse engineering mechanism and a manipulator according to an embodiment of the present invention.

A specific control logic diagram is shown in FIG. 7. During the first clamping, when the X-axis ball screw nut II-7 carrying the fixture II-5 moves to the leftmost position for the first time, assuming that a transmitted electrical signal is at a low level when the diffuse reflection-type photoelectric switch II-8 detects a diffuse reflection signal received through the receiver, through a delay, a loading manipulator IV is waited for to place the blade II-4 at a designated position. Assuming that a time required is $t_0$, after a delay of a time $\Delta t$, the motor II-5-3-1 starts to rotate forward to implement clamping. Because the clamping takes a specific time, after another delay of the time $\Delta t$, the loading and unloading manipulator III retracts, and gets ready to perform a next. After the fixture II-5 implements clamping, the first servo motor II-2-3 starts to run, to enable the X-axis ball screw nut II-7 to run from left to right and then from right to left, so that the reverse engineering instrument II-3 obtains the digital information of the three-dimensional contour of the blade II-4. In this case, the diffuse reflection-type photoelectric switch II-8 receives the diffuse reflection signal again, and the transmitted electrical signal is at the low level again. Assuming that a time $t_2$ is consumed in a reverse engineering stage, a time $t_3$ is consumed in the reverse engineering stage, and this period of time is a grabbing time of the loading and unloading manipulator III. After still another delay of a time $\Delta t$ again, the motor II-5-3-1 reverses, the fixture II-5 is released, and the loading and unloading manipulator III takes out the blade II-4.

In this embodiment, after the reverse engineering ends, through the linkage between the diffuse reflection-type photoelectric switch and the loading and unloading manipulator, the blade is removed from the fixture and is placed on the pallet. Both the pallet and the blade and the pallet and the manipulator have independent locating and clamping mechanisms, so that the blade in the pallet can have a fixed relative coordinate position relative to the manipulator.

A locating apparatus for the pallet and the blade includes a locating top cap, a side locating body, a support nail, and a support block. The locating top cap is a main locating surface of the blade, and limits degrees of freedom of Z-axis movement, X-axis rotation, and Y-axis rotation. According to the six-point locating principle, the side locating body is in linear contact with a tenon part of the blade, and the support nail is in point contact with a side surface of the blade to satisfy the principle. In addition, a resultant force of two fixture bodies in the pallet is perpendicular to the main locating surface, thereby realizing the reliability of the locating and clamping.

A micro servo motor is used as an active member for clamping of the pallet and the blade. A motor support base is fixed to the pallet housing, and the servo motor is fixed to the motor support base. The pallet includes the servo motor, a first fixture body, a second fixture body, and a third fixture body. A main shaft of the servo motor is connected to a spiral gear, and the spiral gear and a helical ring gear form a cross-axis gear pair, for controlling a linear movement of each fixture body. When the pallet clamps, end surfaces of a first fixture body IV-1-1-1, a second fixture body IV-1-1-2, and a third fixture body IV-1-1-3 snugly fit each other to form a complete circle with only a T-shaped gap exposed, thereby reducing the probability of entry of splashed water drops. Plates are welded on the surface for sealing. When the fixture bodies in the pallet are in a limit loosening state, a distance between the fixture bodies is greater than a maximum width of a blade tip shroud, so that there is no interference in a blade clamping process.

Figure 8:
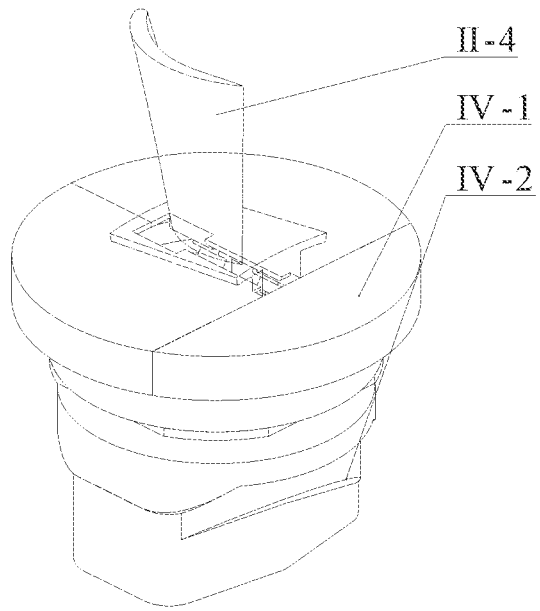
FIG. 8 is a schematic structural diagram of a pallet according to an embodiment of the present invention.
Figure 9:
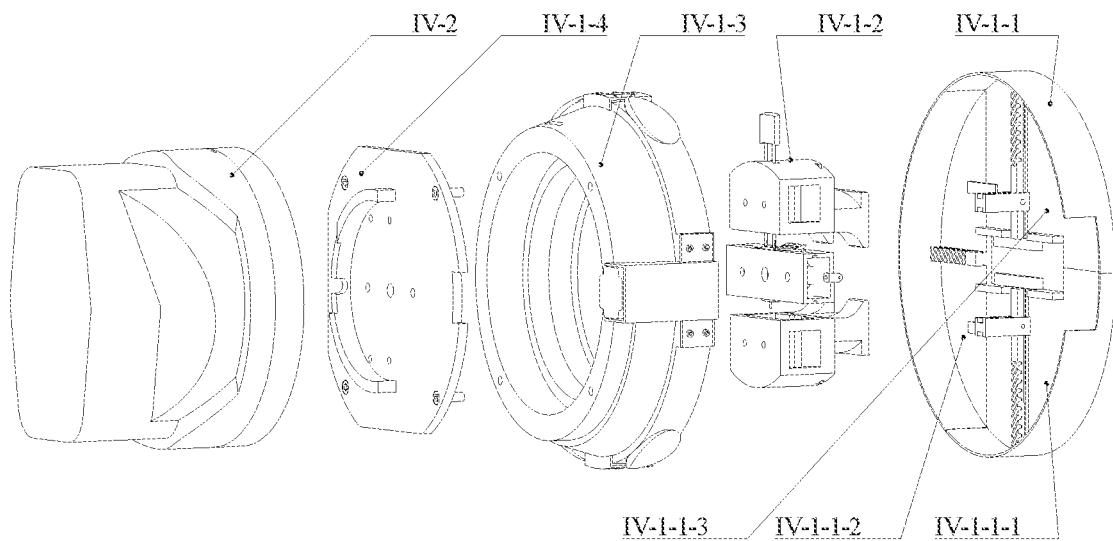
FIG. 9 is an exploded view of a pallet according to an embodiment of the present invention.
Figure 10:
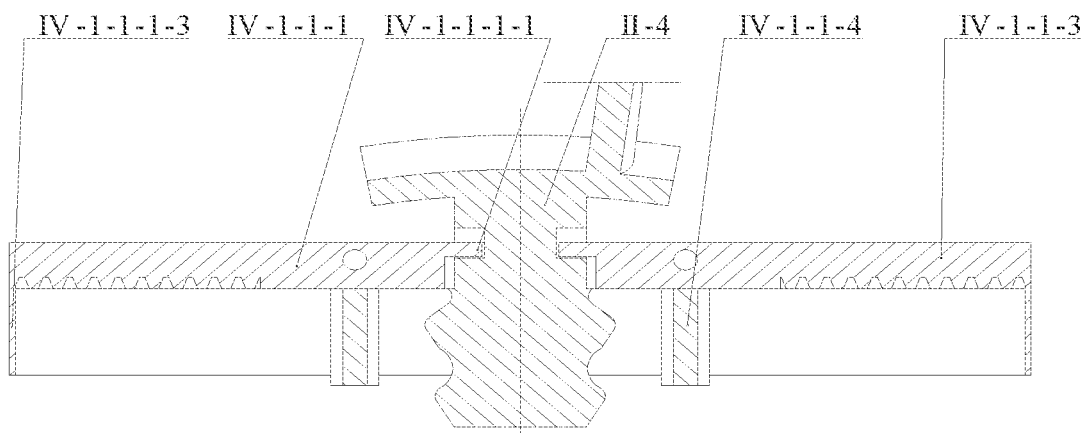
FIG. 10 is a schematic diagram of a clamping state of a pallet according to an embodiment of the present invention.

In this embodiment, with reference to from FIG. 8 to FIG. 10, a pallet IV-1 is connected to a manipulator head IV-2, and the blade II-4 is clamped in the pallet IV-1.

The pallet IV-1 includes a fixture active-apparatus W-1-1, a fixture driven-apparatus IV-1-2, a housing IV-1-3, a connecting seat IV-1-4, and the manipulator head IV-2. The housing IV-1-3 is fixed to the connecting seat IV-1-4, and the connecting seat IV-1-4 is connected to the manipulator head IV-2. The fixture active-apparatus IV-1-1 and the fixture driven-apparatus IV-1-2 are connected to the housing IV-1-3.

Figure 11A:
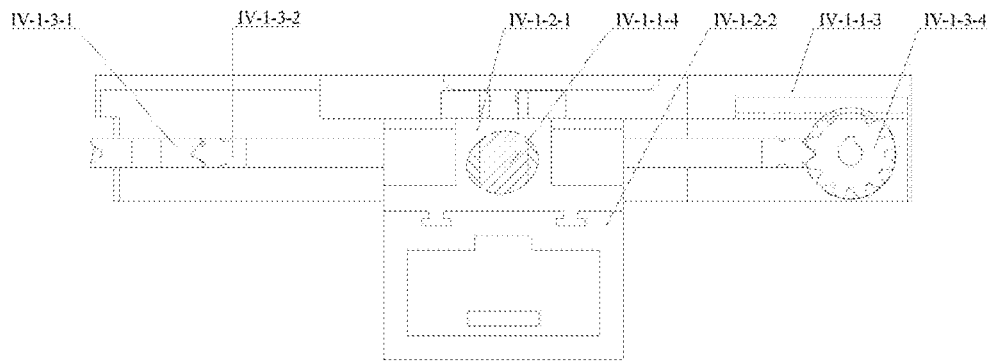
FIG. 11(a) is a cross-sectional view of a manipulator head and a fixture driven-apparatus according to an embodiment of the present invention.

FIG. 11(a) is a schematic diagram of a connection relationship between an active apparatus and a driven apparatus of the pallet. The third fixture body IV-1-1-3 is provided with a through hole for connecting to a pin of a first transmission rod IV-1-1-4, and inserting the first transmission rod IV-1-1-4 into a slider IV-1-2-1. In this case, the first transmission rod IV 1-4 is not only configured to connect the active apparatus and a transmission apparatus of the fixture, but also can support the third clamp specific IV-1-1-3. A first spiral gear IV-1-3-1 is connected to the main shaft of the motor as an active gear, and a second spiral gear IV-1-3-3 on an other side transmits power to the third fixture body IV-1-1-3 through a helical ring gear IV-1-3-2, for the third fixture body IV-1-1-3 to move linearly.

Since during the LSP, water is used as a confinement layer to improve the effect of the LSP, the fixture is affected by water. Therefore, the pallet needs to be sealed to some extent. Therefore, a large area of an upper surface of the pallet is covered, and a quantity of surface plates and a quantity of gaps are reduced as much as possible, so as to improve the sealing effect.

In this embodiment, the blade II-4 has a crafted concave surface to reduce its own weight. A boss matching the concave surface is disposed on the fixture body. A labyrinth seal with a large gap is formed between the boss and the concave surface. Because the blade tip shroud part of the blade II-4 has a specific shielding effect, with the help of the labyrinth seal, infiltration of water is reduced during the LSP, thereby achieving the sealing effect.

The housing IV-1-3 includes a spiral gear, a helical ring gear, a seal end cap, a motor, a motor support base, and a pallet housing. The seal end cap is made of plastic and is connected to the pallet housing with an interference fit. An outer edge of the seal end cap is a concentric circle of an outer edge of the housing. In this way, torque is prevented from being generated due to an irregular shape of the seal end cap during clamping of the fixture body and causing inaccurate clamping. In addition, there is an acute-angle boss on the other end to facilitate removal and replacement.

The spiral gear is connected to the main shaft of the motor by a key. The motor herein is a servo motor with a relatively small volume. The motor is connected to the motor support base by screws to realize locating of the motor. The motor support base is connected to the pallet housing by screws. The relative movement between the helical ring gear and the pallet housing is realized by steel balls.

A locking apparatus is disposed on the pallet, and is designed to cause the pallet to fall off in an emergency. The locking apparatus is assembled through a link according to the principle of leverage, and does not affect locating when the manipulator grabs the pallet, and only acts during linkage with a pallet standby station. For a locating apparatus for the manipulator and the pallet, an upper end surface of a ring housing is used as a main plane of a pallet base, to limit degrees of freedom of Z-axis movement, X-axis rotation, and Y-axis rotation. According to the six-point locating principle, a cambered surface and a hemispherical surface of a locating body of the manipulator head are in contact with the base to satisfy the principle. In addition, a cylinder is used as an active member, a cylinder base is connected to the manipulator, and a sensor base is used as a center of the link, to implement the clamping and loosening functions. The manipulator is provided with threaded holes for fixing the sensor base. The sensor base is provided with two threaded holes for fixing the diffuse reflection-type photoelectric switch, and is provided with a horizontal through hole for storing a transmission line of a sensor, which is in direction communication with a circular protrusion on the ring housing. One of the two diffuse reflection-type photoelectric switches on the sensor is configured to detect whether a blade is in place, and the other is configured to detect a relative distance between the manipulator and the pallet.

Figure 11B:
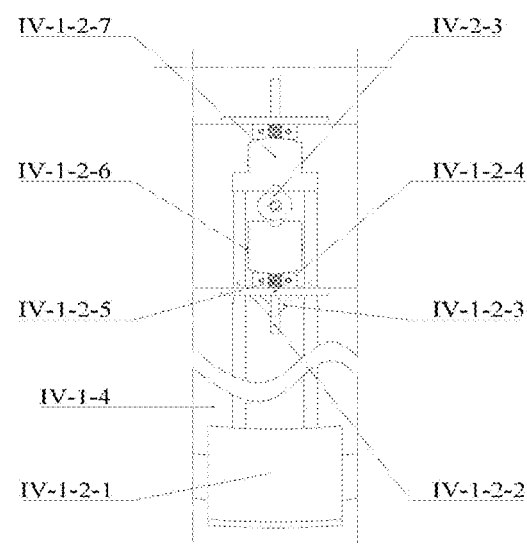
FIG. 11(b) is a view of an unlocked state of a locking apparatus according to an embodiment of the present invention.

FIG. 11(b) is a view of an unlocked state of a locking apparatus, including an unlocking rod IV-1-2-1, a first slider IV-1-2-2, a lever IV-1-2-3, a support frame IV-1-2-4, a spring IV-1-2-5, a pin IV-1-2-6, and a second slider IV-1-2-7. One end of the unlocking rod IV-1-2-1 is connected to a rectangular through hole of the pallet housing, and an other end is in contact with the second slider IV-1-2-7. Two ends of the support frame IV-1-2-4 are each provided with a rectangular groove having a size larger than a diameter of the unlocking rod IV-1-2-1, allowing a hinge head on the unlocking rod IV-1-2-1 to pass through. The lever IV-1-2-3 is connected to the unlocking rod IV-1-2-1 by the hinge head. A short side of the rectangular groove on the support frame IV-1-2-4 is used as a fulcrum of the lever IV-1-2-3. The first slider IV-1-2-2 and the second slider IV-1-2-7 are both connected to the connecting seat IV-1-4 by the pin IV-1-2-6, allowing the two sliders to slide along a straight line. An other end of the first slider IV-1-2-2 passes through a hole on the support frame IV-1-2-4 through the spring IV-1-2-5, and a rectangular through hole is opened at a tail to allow the lever IV-1-2-3 to pass through. The width of the head of the second slider IV-1-2-7 is greater than that of the first slider IV-1-2-2, and no rectangular through hole is opened at a tail. In such an unlocked state, a lower end of the unlocking rod IV-1-2-1 is forced to move upward against the second slider IV-1-2-7, and according to the principle of leverage, the first slider IV-1-2-2 with the rectangular through hole is lifted up by using the short side of the rectangular groove on the support frame IV-1-2-4 as a fulcrum, and moves downward. The reverse movement between the first slider IV-1-2-2 and the second slider IV-1-2-7 makes a distance between the two larger than a diameter of a head of the sensor base IV-2-3, thereby implementing unlocking. It should be noted that this is not a limit state of unlocking, so that in the unlocked state, the head of the sensor can enter the pallet arbitrarily without affecting the locating and clamping of the fixture on the manipulator.

A specific working process of the pallet is as follows: The main shaft of the motor drives the spiral gear, which acts as an active gear and rotates the spiral gear ring as a driven gear to drive the three evenly distributed spiral gears to rotate, so as to drive the first fixture body IV-1-1-1, the second fixture body IV-1-1-2, and the third fixture body IV-1-1-3 to move. The second fixture body IV-1-1-2 only implements sealing and does not participate in clamping and loosening. In a loosening stage, a left end surface of the first fixture body IV-1-1-1 does not exceed the rightmost side of the blade. In this way, the problem of inaccurate locating caused by the interference in a process of placing the blade II-4 into the pallet IV-1 is avoided. In a clamping stage, the third fixture body IV-1-1-3 drives the slider IV-1-2-1 through the first transmission rod IV-1-1-4, so that only one side surface of the slider is in contact with a tenon of the blade II-4. In such a clamping manner, a resultant force of clamping forces of the blade II-4 is perpendicular to a main locating plane, thereby realizing the reliability of the clamping.

Figure 12A:
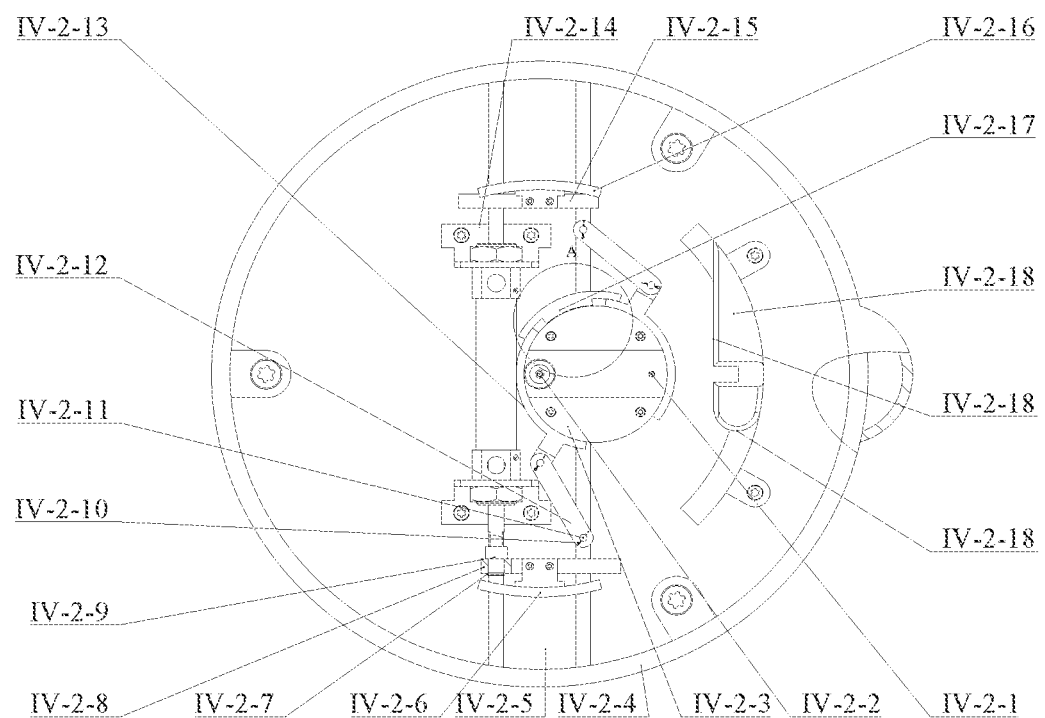
FIG. 12(a) is a schematic diagram of a connection between an active apparatus and a driven apparatus according to an embodiment of the present invention.
Figure 12B:
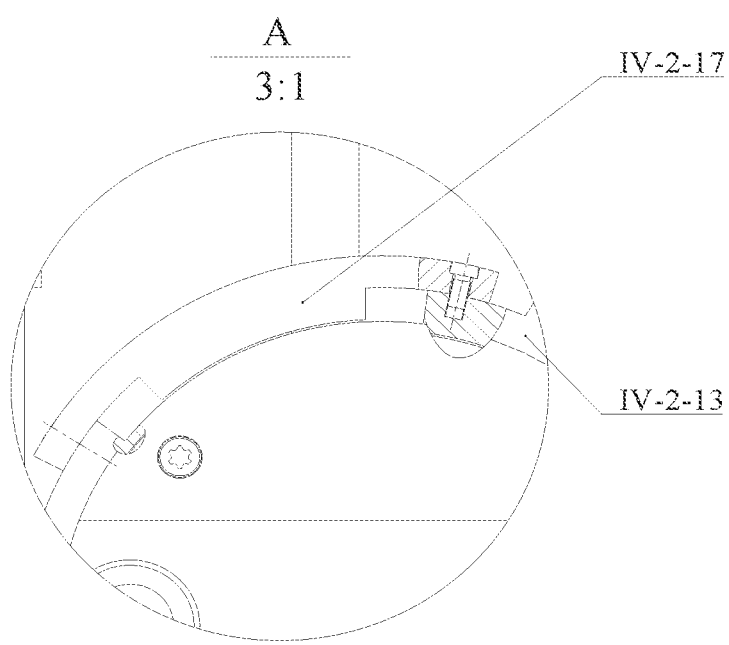
FIG. 12(b) is a cross-sectional view of a connection between a manipulator head and a pallet according to an embodiment of the present invention.

Referring to FIGS. 12 (a) and (b), the manipulator head IV-2 includes a first diffuse reflection-type photoelectric sensor IV-2-1, a second diffuse reflection-type photoelectric sensor IV-2-2, a sensor base IV-2-3, a ring housing IV-2-4, a manipulator IV-2-5, a first clamping jaw IV-2-6, a shaft end retaining ring IV-2-7, a first connecting block IV-2-8, a double-acting cylinder IV-2-9, a cotter pin IV-2-10, a hinge head IV-2-11, a second transmission rod IV-2-12, a second transmission ring IV-2-13, a cylinder base IV-2-14, a second connecting block IV-2-15, a second clamping jaw IV-2-16, a fixing ring IV-2-17, and a pallet locating body IV-2-18. The sensor base IV-2-3 and the ring housing IV-2-4 are fixed on the manipulator IV-2-5. The ring housing IV-2-4 includes a circular convex ring facing a horizontal through hole of the sensor base IV-2-3, which is a place at which an external data line is connected, and a connected part is protected. The first clamping jaw IV-2-6 is connected to the first connecting block IV-2-8. The first connecting block IV-2-8 completes axial locating through the shaft end retaining ring IV-2-7 and a shaft shoulder on a push rod of the double-acting cylinder IV-2-9. The first connecting block IV-2-8 is in contact with the rectangular groove on the manipulator IV-2-5 through a T-shaped structure, proper contact widths on both sides realize relatively good sliding conditions and the stability and reliability of the movement. The double-acting cylinder IV-2-9 includes the cylinder base IV-2-14 and two air inlets and outlets. The cylinder base IV-2-14 is connected to the manipulator IV-2-5, and the air inlets and outlets realize forward and reverse linear movement of the cylinder push rod. One end of the second transmission rod IV-2-12 is hingedly connected to the first connecting block IV 8. Because the manipulator needs to move in six axes, and an upside-down situation is inevitable, the cotter pins IV-2-10 are disposed at both ends of the hinge head IV-2-11 to prevent the hinge head IV-2-11 from shifting axially. An other end of the second transmission rod IV-2-12 is also hingedly connected to the second transmission ring IV-2-13. The second transmission ring IV-2-13 rotates around a cylinder center of the sensor base IV-2-3 through a trapezoidal groove at a lower end of the sensor base IV-2-3, and are in contact with only two inclined surfaces of the trapezoidal groove without coming into contact with top and bottom surfaces of the trapezoidal groove. In this way, the transmission precision and manufacturability can be both guaranteed. A material part of a symmetrical middle part of the second transmission ring IV-2-13 is removed, so that the second transmission ring IV-2-13 has a specific degree of flexibility, and the second transmission ring IV-2-13 may be placed into the trapezoidal groove of sensor base IV-2-3 through a small amount of deformation. The fixing ring IV-2-17 and the second transmission ring IV-2-13 are used together to improve the rigidity of the second transmission ring IV-2-13 through screws and prevent deformation during work.

An inner circular surface of the fixing ring IV-2-17 is not in contact with the removed material part of the second transmission ring IV-2-13. This is to reduce unnecessary contact and reduce the processing difficulty. The second connecting block IV-2-15 is connected to the second clamping jaw IV-2-16. The second connecting block IV-2-15 and inner circular surfaces of the first clamping jaw IV-2-6 and the second clamping jaw IV-2-16 complete clamping of an outer circular surface of a boss of the connecting seat IV-1-4. The pallet locating body IV-2-18 is connected to the manipulator IV-2-5. For the entire fixture of the manipulator, an upper end surface of the ring housing IV-2-4 is in planar contact with an end surface of the connecting seat IV-1-4, to limit three degrees of freedom, a first cambered surface IV-2-18-1 of the pallet locating body IV-2-18 is in linear contact with a side surface of the boss of the connecting seat IV-1-4, to limit two degrees of freedom, and a second cambered surface IV-2-18-2 of the pallet locating body IV-2-18 is in point contact with an other vertical side surface of the boss of the connecting seat IV-1-4, to limit one degree of freedom, thereby limiting six degrees of freedom. The manipulator head IV-2 is used as an active member by using the double-acting cylinder IV-2-9, to drive the first connecting block IV-2-8 to move linearly on the groove of the manipulator IV-2-5, thereby driving the first clamping jaw IV-2-6 to retract inward to realize the clamping of the connecting seat IV-1-4.

A clamping process of the working manipulator IV is as follows. First, the working manipulator IV moves to below the pallet, and moves upward to achieve locating. In this case, the first diffuse reflection-type photoelectric sensor IV-2-1 receives a reflection signal, and after a delay of a time, drives the double-acting cylinder IV-2-9 to connect to the pallet. In this case, the pallet standby station is released, the pallet follows the movement of the working manipulator IV, and the loading and unloading manipulator placed the reverse-engineered blade II-4 into the pallet. The second diffuse reflection-type photoelectric sensor IV-2-2 receives the reflection signal, and after a delay of a time, drives the motor to move. The pallet clamps the blade II-4, and subsequently, drives the blade II-4 for LSP.

The manipulator implements absorption layer coating and LSP of the blade by using a path obtained in the reverse engineering, and a water trough is arranged at a lower portion of the LSP apparatus to collect water during the LSP.

After the overall work is finished, the manipulator places the pallet on the pallet standby station for drying. The pallet standby station includes an unlocking rod to unlock the locking apparatus in the pallet, so that the manipulator is removed from the pallet. In the pallet standby station, the servo motor is used as an active member and is connected to a main shaft through a coupling. A pair of end-surface ratchets, a fixed ratchet and a movable ratchet, are mounted on the main shaft. The movable ratchet moves vertically by using a disc spring, is provided with a T-shaped annular groove on a lower end surface and a through groove, and is connected to a cylinder by a slider. In addition, four cylinders are uniformly arranged on a standby station base. The movable ratchet rotates clockwise to implement clamping, and rotates counterclockwise to implement steering of the pallet standby station. The cylinders force the movable ratchet to be detached from the fixed ratchet and rotate counterclockwise to loosen. Due to use of a ratchet mechanism, there is a strict quantitative relationship between a rotation angle of the servo motor and specific clamping/loosening of the fixture body of the pallet standby station.

Figure 13:
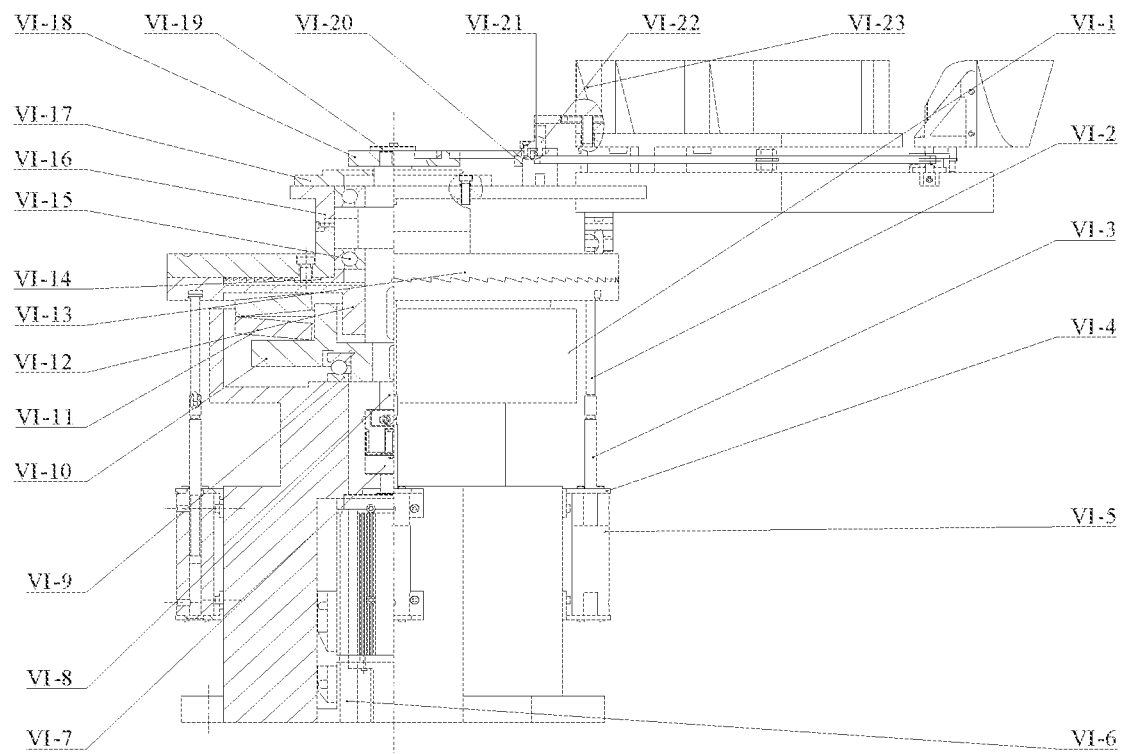
FIG. 13 is a half-cross-sectional view of a structure of a pallet standby station according to an embodiment of the present invention.
Figure 14:
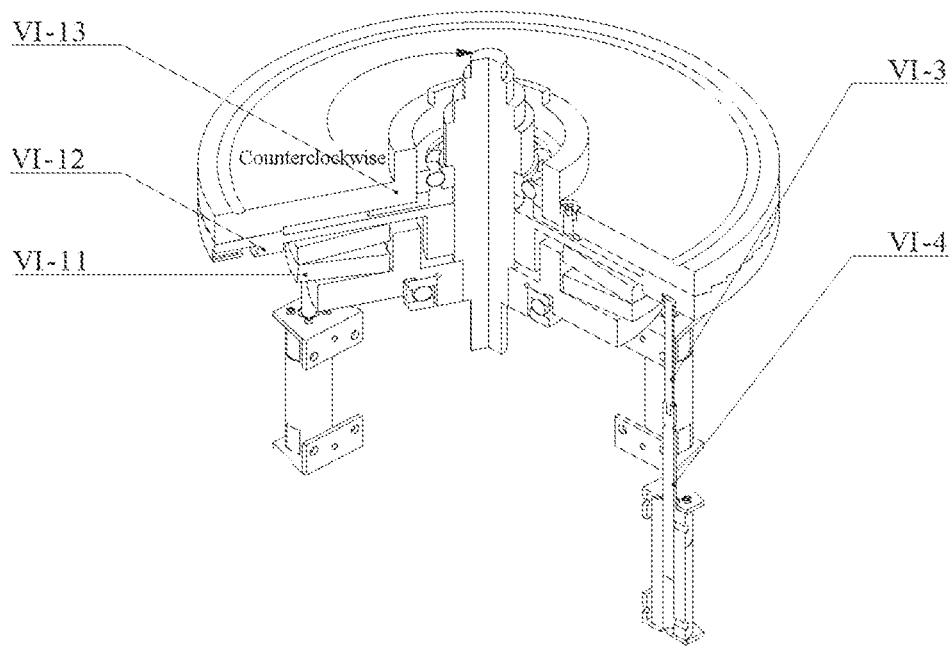
FIG. 14 is an axonometric diagram of an engagement relationship between end-surface ratchets according to an embodiment of the present invention.
Figure 15:
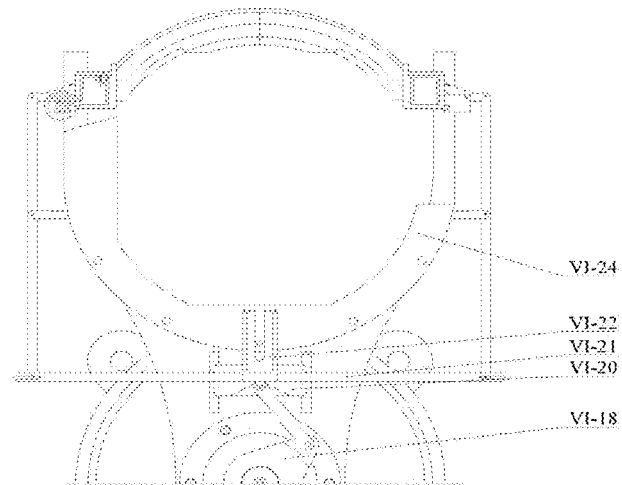
FIG. 15 is a schematic diagram of a transmission part of a pallet standby station according to an embodiment of the present invention.

Specifically, with reference to from FIG. 13 to FIG. 15, a standby station base VI-1 is connected to a base IX by base screws to fix a pallet standby station VI. A cylinder VI-5 is connected to a cylinder support base VI-4. The cylinder support base VI-4 is connected to the side surface of the standby station base VI-1. There are four cylinders VI-5 arranged symmetrically on the side surface. The cylinder VI-5 is provided with two holes to respectively realize forward and reverse movement of a cylinder rod VI-3. A second servo motor VI-6 includes a base and is connected to the base IX. The second servo motor VI-6 is connected to a stepped shaft VI-8 by a gear coupling VI-7, and the cylinder rod VI-3 is connected to a limiting rod VI-2, so that the limiting rod VI-2 is movable along a vertical direction synchronously with the cylinder rod VI-3. One end of a thrust bearing VI-9 is in contact with a boss of the standby station base VI-1, and an other end is in contact with a spring support base VI-10, to implement axial locating of the thrust bearing VI-9. An other end of the spring support base VI-10 is in contact with a shaft shoulder of the stepped shaft VI-8, to implement axial locating of the spring support base VI-10. A part of the spring support base VI-10 in contact with the thrust bearing VI-9 is provided with a rhombus groove at a root, to facilitate mounting of the thrust bearing and appropriately reduce difficulty in processing the spring support base VI-10. The spring support base VI-10 is radially located through a keyway on the stepped shaft VI-8. An outer edge of the spring support base VI-10 is provided with a disc spring VI-11, and an inner diameter of the disc spring VI-11 is slightly greater than an outer diameter of the spring support base VI-10. Therefore, a space is left for the disc spring VI-11 when the inner diameter becomes smaller during compression. A movable end-surface ratchet VI-12 is used as a movable member and is not axially located, and only a fixed end-surface ratchet VI-13 is axially located by using the keyway on the stepped shaft VI-8. Different from an ordinary keyway, because the movable end-surface ratchet VI-12 needs to move up and down along an axial direction of the stepped shaft VI-8, a side surface of the keyway herein is in an interference fit with the stepped shaft VI-8, and is in a clearance fit with the movable end-surface ratchet VI-12. A lower end surface of the movable end-surface ratchet VI-12 is in contact with the disc spring VI-11. When the movable end-surface ratchet VI-12 rotates counterclockwise (the counterclockwise rotation herein refers to counterclockwise rotation when viewed from top to bottom along the axial direction of the stepped shaft VI-8, the counterclockwise rotation and clockwise rotation mentioned below are all based on this, whose details are not described again), the movable end-surface ratchet VI-12 moves downward because an inclined surface is under stress, and after passing a ratchet tooth, returns, under a force from the compressed disc spring VI-11, to a state in which the movable end-surface ratchet VI-12 is attached to the fixed end-surface ratchet VI-13.

Figure 16:
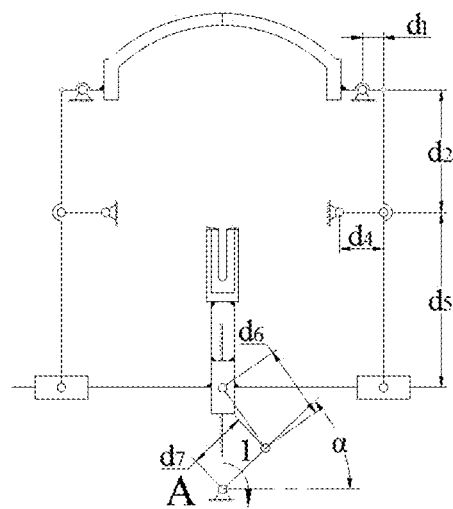
FIG. 16 is a brief structural diagram of a clamping state of a transmission part of a pallet standby station according to an embodiment of the present invention.
Figure 17:
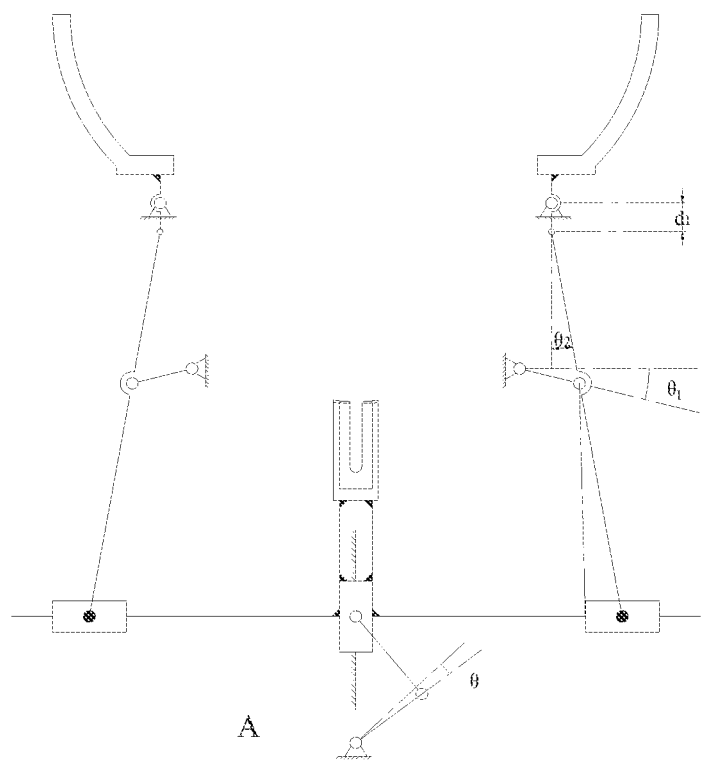
FIG. 17 is a brief structural diagram of a loosening state of a transmission part of a pallet standby station according to an embodiment of the present invention.

The lower end surface of the movable end-surface ratchet VI-12 is provided with an annular "T"-shaped groove, and a "T"-shaped through groove is opened on the right side, so that the limiting rod VI-2 can slide into a corresponding position through the through groove, and is connected to the cylinder support base VI-4. A depth of the groove is greater than a width of a head of the limiting rod VI-2. Therefore, when the fixed end-surface ratchet VI-13 rotates counterclockwise, the existence of the limiting rod VI-2 does not affect the vertical movement of the movable end-surface ratchet VI-12. In addition, a corresponding function is completed during unlocking. One end of the fixed end-surface ratchet VI-13 is connected to a first shaft end cap VI-14, an inner ring of a radial angular contact ball bearing VI-15 is located by the shaft shoulder of the stepped shaft VI-8, and an outer ring is located by the first shaft end cap VI-14. An upper end surface of the fixed end-surface ratchet VI-13 is connected to a bottom plate VI-16, to implement axial and radial fixation. The bottom plate VI-16 is connected to a second shaft end cap VI-17, an outer ring of an angular contact ball bearing on the side of the bottom plate VI-16 is located by the second shaft end cap VI-17, and an inner ring is located by the shaft shoulder of the stepped shaft VI-8. As a member connected to the bottom plate VI-16, only when the movable end-surface ratchet VI-12 rotates clockwise, the second shaft end cap VI-17 drives the fixed end-surface ratchet VI-13, the bottom plate VI-16, and the second shaft end cap VI-17 to rotate. Therefore, a hole diameter of the second shaft end cap VI-17 is slightly greater than a diameter of the stepped shaft VI-8 at the shaft end. There is a roller under the bottom plate VI-16 to implement auxiliary support. A second cam VI-18 is connected to the stepped shaft VI-8 through the keyway, one end of the second cam VI-18 is located by the shaft shoulder of the stepped shaft VI-8, and an other end is connected to a second shaft end retaining cap VI-19, to implement axial and radial locating. There is a cylinder on the second cam VI-18 for connecting to the link. The bottom plate VI-16 is provided with two rectangular through grooves, a linear slider VI-20 is placed in the rectangular through groove and slides along the rectangular through groove, and the bottom plate VI-16 is connected to an unlocking block VI-22 by screws. A protective shell VI-23 protects the side surface of the pallet housing IV-1-3. The protective shell VI-23 is connected to a clamping plate VI-24. A clamping part of the pallet standby station is a crank-link mechanism realized by using the second cam VI-18 as an active member to drive a long link VI-21. The links are connected by hinges, and structural relationship diagrams are shown in FIG. 16 and FIG. 17.

A working process of the pallet standby station VI is that the working manipulator IV moves to an accurate position to enter the pallet standby station VI that is in a loosening state, the fixed end-surface ratchet VI-13 rotates counterclockwise to implement clamping, and the unlocking block VI-22 at the other end moves forward at the same time, and pushes the unlocking rod IV-1-2-1 to retract to implement unlocking. After the clamping is completed, the manipulator may retract from the pallet. In this case, the movable end-surface ratchet VI-12 rotates clockwise again, and drives the fixed end-surface ratchet VI-13 and the bottom plate VI-16 to rotate 180°. Drying is implemented by using an axial flow ventilator V. After the drying, the movable end-surface ratchet VI-12 rotates 180° again to return to an initial position. When the manipulator removes the pallet from the pallet standby station VI, the cylinder VI-5 works and drives the cylinder rod VI-3 to move downward to force the movable end-surface ratchet VI-12 to be detached from the fixed end-surface ratchet VI-13. In this case, the movable end-surface ratchet VI-12 rotates clockwise, the apparatus is in a loosening state, and the working manipulator VI takes out the pallet. The brief structural diagrams of clamping and loosening of the entire apparatus are shown in FIG. 16 and FIG. 17.

When in a limit loosening state, the pallet may be placed from one side without interference, and a degree of freedom of the pallet is F=3n−2$p_L$=3*11−2*16=1. Because of particularity of the end-surface ratchet, only when a rotation angle is a multiple of a ratchet tooth angle, that is, $$\text{rotation angle} = k\frac{360°}{\text{quantity of ratchet teeth}},$$

the accuracy of transmission can be ensured; otherwise, an error is caused when counterclockwise rotation becomes clockwise rotation, resulting in accumulation of errors. Assuming that a length of each rod is known, and an angle α between a rod 1 and a horizontal direction at a moment of clamping is known, then the following can be obtained:

$$\theta_2 = \arctan\left(\frac{d_4 - d_1}{d_2 - d_1}\right),$$

$$\theta_1 = \arcsin\left[\frac{d_2(\cos\theta_2 - 1) + d_1}{d_4}\right].$$

A displacement Δx of descending of a slider 3 is: Δx=$d_4$ sin $\theta_1$+$d_5$ cos $\theta_2$−$d_5$, A distance between the slider 3 and a point A in a clamping state is: $l_{3A}$=$d_6$ sin α+$d_7$ cos α

A distance between two points in a loosening state is:

$$l'_{3A}=l_{3A}-\Delta x=d_6 \sin(\alpha-\theta)+d_7 \cos(\alpha-\theta).$$

In this way, a value of θ can be obtained provided that θ is an integer multiple of the ratchet tooth angle.

Figure 18:
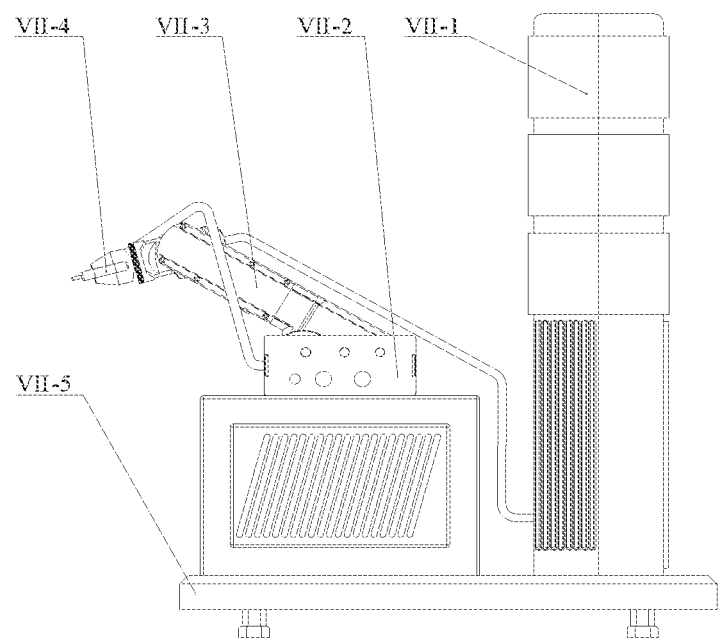
FIG. 18 is a schematic structural diagram of a coating apparatus according to an embodiment of the present invention.

Referring to FIG. 18, a coating apparatus VII includes a bin VII-1, an electrically-controlled apparatus VII-2, a support VII-3, a coating head VII-4, and a coating apparatus base VII-5. The bin VII-1 extrudes black paint with some fluidity through a pipe into the coating head VII-4. The electrically-controlled apparatus VII-2 is connected to a resistance wire inside the coating head VII-4 to heat the black paint inside the coating head VII-4, so that the black paint has higher fluidity. The working manipulator IV carries the blade II-4 that has been reverse engineered and for which path planning has been performed, for the step of coating of an absorption layer. In a single pulse, the absorption layer absorbs energy and causes a thickness of plasma evaporation to be:

$$D = \frac{(1-d_k)I_0 t}{d[c_s(T_n - T_0) + L_n + c_v(T_v - T_n) + L_v]}$$

where D is vaporization thickness, $d_k$ is surface energy reflectance, $c_s$ is solid specific heat capacity, $c_v$ is liquid specific heat capacity, $T_n$ is melting point of substance, $T_0$ is constant, $T_0$=273 K, $T_v$ is boiling point of substance under corresponding pressure, $L_n$ is enthalpy of fusion of substance, $L_v$ is enthalpy of vaporization of substance, $I_0$ is power density, d is solid mass density of material, and t is laser pulse time. It should be noted that laser pulses overlap, so that a thickness of the black paint coating is 2D.

Figure 19:
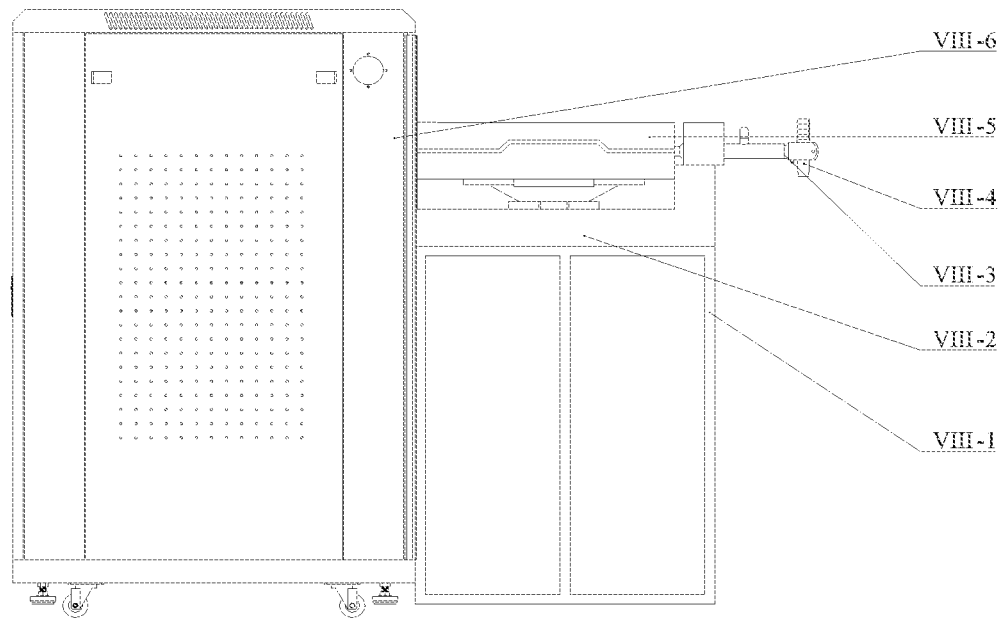
FIG. 19 is a schematic structural diagram of an LSP apparatus according to an embodiment of the present invention.

Referring to FIG. 19, an LSP apparatus includes a laser emitter base VIII-1, a marble pedestal VIII-2, a laser head VIII-3, a water flow port VIII-4, a lens array VIII-5, and a laser generator VIII-6. The laser generator VIII-6 generates a laser, which is processed by the lens array VIII-5, and then emitted from the laser head, to perform LSP processing on the blade II-4 with a specific distance. The laser generator VIII-6 is equipped with laser generators with different energy densities. A laser generator with high energy density and a short interaction time is configured for LSP. A laser generator with low energy density and a long interaction time is configured for cleaning. The working manipulator IV herein completes steps of the LSP and cleaning the absorption layer with remaining black paint.

When three-dimensional contour scanning is performed the blade II-4 and a three-dimensional contour is reverse engineered as a digital data and stored in a computer, relative position coordinates of each point on a blade processing path are determined. In a manipulator system, relative position coordinates between a manipulator claw and a manipulator are determined. When the pallet implements clamping, a relative position of the blade II-4 relative to the manipulator claw is also determined. In this case, a movement track of the manipulator may be calculated backward through the processing path, to realize distance control of a to-be-processed surface when a laser focus distance is fixed during the LSP process.

Figure 20:
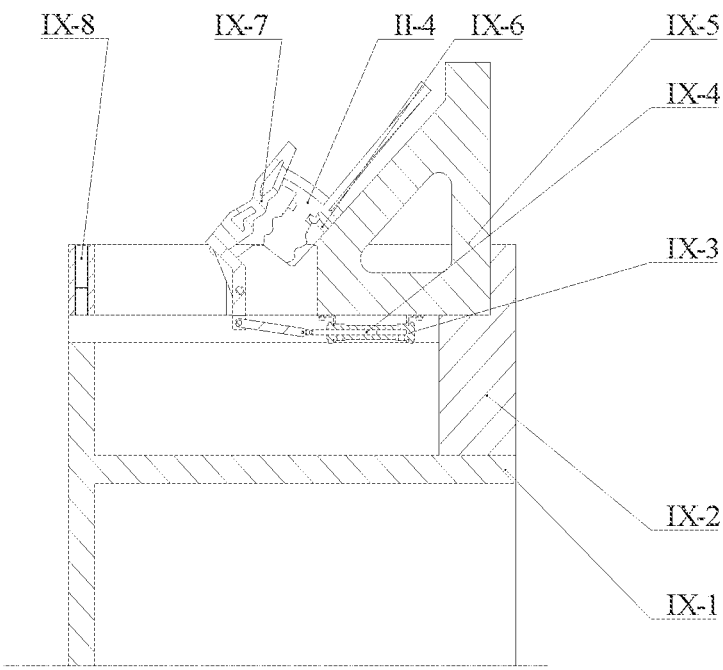
FIG. 20 is a schematic structural diagram of a rack according to an embodiment of the present invention.

Referring to FIG. 20, a rack I and a rack IX are the same in structure, except for that the rack I stores an unprocessed blade II-4, and the rack IX stores a blade II-4 on which LSP has been performed. Only the rack IX is described herein. A rack base IX-1 is connected to a rack support base IX-2. The rack support base IX-2 is connected to a locating ramp IX-5. A linear cylinder IX-3 is fixed on the locating ramp IX-5 by a cylinder support base IX-5, and the linear movement of a piston rod IX-4 drives the rotary clamping body IX-7 to perform fixed-axis rotation for implementing clamping. A locating manner is that: five degrees of freedom are limited by using two inclined surfaces as "V shape-like blocks", a ball head locating body IX-6 abuts against a side surface of a crafted concave surface of the blade II-4 to limit one degree of freedom, and a total of six degrees of freedom are limited. A width of the piston rod IX-4 is slightly narrower than a width of the blade, and two end surfaces are reserved to provide gripping positions for the loading and unloading manipulator III. A second diffuse reflection-type photoelectric switch IX-8 is buried in a front end of the rack IX through a threaded connection, and when the loading and unloading manipulator III comes for grabbing, the second diffuse reflection-type photoelectric switch IX-8 generates a signal to trigger the linear cylinder IX-3 to run.

The specific implementations of the present invention are described above with reference to the accompanying drawings, but are not intended to limit the protection scope of the present invention. A person skilled in the art should understand that various modifications or deformations may be made without creative efforts based on the technical solutions of the present invention, and such modifications or deformations shall fall within the protection scope of the present invention.

What is claimed is:

1. An automated laser shock peening (LSP) process equipment system for an aero-engine blade, the automated LSP process equipment system comprising: a base, wherein a loading-unloading manipulator, a working manipulator, a reverse engineering mechanism, a coating apparatus, and an LSP apparatus are disposed on the base; wherein
    the loading-unloading manipulator is configured to grab a blade to be processed and place the blade to be processed on the reverse engineering mechanism;
    wherein the reverse engineering mechanism comprises:
        at least one scanning device, used to scan a surface contour of the blade to be processed and generate and transmit three-dimensional (3D) surface contour data information to a controller,
        wherein the controller is connected to the at least one scanning device, used to process the transmitted 3D surface contour data information and generate a working path of the working manipulator for performing an absorption layer coating operation and a LSP operation on the blade to be processed by using a reverse engineering, and used to transmit the working path to the working manipulator;
    a detachable fixture, removably mounted on the working manipulator and used to receive and clamp the blade to be processed from the loading-unloading manipulator;
    wherein the loading-unloading manipulator places the blade to be processed into the detachable fixture, and the working manipulator holds the blade to be processed clamped in the detachable fixture to a corresponding position to implement the absorption layer coating operation and the LSP operation through the working path generated according to the reverse engineering; and
    a fixture standby station disposed on the base for holding the detachable fixture, and the fixture standby station takes the detachable fixture with a processed blade to a drying position for drying by using an axial flow ventilator,
    wherein the fixture standby station comprises an unlocking block, and the unlocking block is used to release the detachable fixture from the working manipulator by pressing a locking apparatus disposed on the detachable fixture,
    wherein the fixture standby station further comprises:
    a servo motor, connected to a main shaft of the fixture standby station through a coupling, wherein a fixed ratchet and a movable ratchet are mounted on the main shaft, and the servo motor is configured to drive the fixed ratchet or the movable ratchet to rotate clockwise and counterclockwise; and
    a plurality of cylinders, uniformly arranged on a base of the fixture standby station and used to pull the movable ratchet to detach from the fixed ratchet through limiting rods, wherein an annular T-shaped groove is provided on a lower end surface of the movable ratchet, a T-shaped head end of each of the limiting rods is slidably connected to the annular T-shaped groove, and an tail end of the each of the limiting rods is connected to a cylinder rod of corresponding one of the plurality of the cylinders, a disc spring is mounted under the lower end surface of the movable ratchet and is used to restore the movable ratchet to a state of being attached to the fixed ratchet;

wherein, under a state that the movable ratchet is detached from the fixed ratchet, as the fixed ratchet rotates clockwise, a clamping part of the fixture standby station is in a loosening state for placing in or removing the detachable fixture by the working manipulator, as the fixed ratchet rotates counterclockwise, the clamping part of the fixture standby station clamps the detachable fixture, and the detachable fixture is released from the working manipulator simultaneously; and under the state that the movable ratchet is attached to the fixed ratchet, the movable ratchet rotates 180° counterclockwise to bring the fixed ratchet with the detachable fixture from an initial position to the drying position for drying, after the drying, the movable ratchet rotates 180° counterclockwise again to bring the fixed ratchet with the detachable fixture to return to the initial position, wherein a relationship between a rotation angle θ of a cam of the clamping part for clamping or loosening the detachable fixture and quantity of ratchet teeth is $$\theta = k \frac{360°}{\text{quantity of ratchet teeth}}$$

where, k is an integer;

through obtaining a length of a first rod, a second rod, and a third rod of the clamping part and an angle α between the cam and a horizontal direction in a clamping state, then obtaining:

$$\theta_2 = \arctan\left(\frac{d_4 - d_1}{d_2 - d_1}\right), \theta_1 = \arcsin\left[\frac{d_2(\cos\theta_2 - 1) + d_1}{d_4}\right],$$

where $\theta_1$ and $\theta_2$ denote a rotation angle of the first rod and the second rod from the clamping state to a loosening state, respectively;

then a displacement Δx of a slider of the clamping part moving between the clamping state and the loosening state is:

$$\Delta x = d_4 \sin\theta_1 + d_5 \cos\theta_2 - d_5,$$

a distance between the slider and a rotation point A of the fixed ratchet in the clamping state is: $l_{SA} = d_6 \sin\alpha + d_7 \cos\alpha$, and a distance between the slider and the rotation point A in the loosening state is: $l'_{SA} = l_{SA} - \Delta x = d_6 \sin(\alpha - \theta) + d_7 \cos(\alpha - \theta)$;

where, $d_1$ is a length of the third rod, $d_2$ and $d_5$ is a total length of the second rod, $d_4$ is a length of the first rod, $d_6$ is a length of a fourth rod, and $d_7$ is a length of the cam;

then a value of θ is obtained, and the quantity of the ratchet teeth is obtained by taking a reasonable value for k.

2. The automated LSP process equipment system for an aero-engine blade according to claim 1, further comprising:

a loading rack for storing blades to be processed and an unloading rack for storing processed blades after the LSP treatment, wherein the loading rack or the unloading rack comprises a cylinder, a clamping member, and a diffuse reflection-type photoelectric switch; and after the diffuse reflection-type photoelectric switch detects the loading-unloading manipulator, the clamping member is controlled by the cylinder to loosen, to allow the loading-unloading manipulator to take out the blade to be processed from the loading rack or to place the processed blade into the unloading rack.

3. The automated LSP process equipment system for an aero-engine blade according to claim 1, wherein the reverse engineering mechanism further comprises: a base, wherein a fixture, an X-axis feeding apparatus, and at least one Z-axis feeding apparatus are separately disposed on the base; wherein the fixture is disposed on the X-axis feeding apparatus, and is able to move along an X-axis direction; the at least one scanning device is disposed on the at least one Z-axis feeding apparatus, and is able to move along a Z-axis direction; and when the fixture moves along the X-axis direction, the at least one scanning device is configured to scan the surface contour of the blade to be processed clamped on the fixture.

4. The automated LSP process equipment system for an aero-engine blade according to claim 3, wherein a servo motor is provided on the fixture and is used as an active member to perform a clamping of the blade to be processed in the X-axis direction by driving a slider-crank mechanism on one end of the fixture, and to perform a clamping of the blade to be processed in a Y-axis direction by driving a cam pushrod mechanism on another end of the fixture.

5. The automated LSP process equipment system for an aero-engine blade according to claim 3, wherein a diffuse reflection-type photoelectric switch is disposed on the reverse engineering mechanism and is configured to detect whether the fixture reaches a set position, as the fixture is detected to have reached the set position, the loading-unloading manipulator is controlled to perform loading and unloading operations, and the fixture is controlled to perform clamping or loosening of the blade to be processed.

6. The automated LSP process equipment system for an aero-engine blade according to claim 1, wherein the detachable fixture comprises: a first fixture body, a second fixture body, and a third fixture body; a main shaft of a servo motor is connected to a spiral gear, and the spiral gear and a helical ring gear form a cross-axis gear pair, for controlling a linear movement of the first fixture body, the second fixture body, and the third fixture body; and when the detachable fixture is in a clamping state, end surfaces of the first fixture body, the second fixture body, and the third fixture body snugly fit each other to form a complete plane.

7. The automated LSP process equipment system for an aero-engine blade according to claim 6, wherein the locking apparatus comprises: an unlocking rod, a support frame, a lever, a first slider, and a second slider; one end of the unlocking rod is connected to a housing of the detachable fixture, and another end of the unlocking rod is connected to the first slider; the second slider is disposed in the unlocking rod, and has a movement direction opposite to that of the first slider; the lever is connected to the unlocking rod through hinge heads; each end of the support frame is provided with a rectangular groove, and the hinge heads are configured to pass through the rectangular grooves; a short side of the rectangular groove is used as a fulcrum of the lever; and a spring is disposed between the second slider and the support frame, and the lever passes through a through hole at an end of the second slider.

* * * * *